(12) United States Patent
Nakashima et al.

(10) Patent No.: US 6,636,531 B1
(45) Date of Patent: Oct. 21, 2003

(54) COMMUNICATION DEVICE AND METHOD

(75) Inventors: Koichi Nakashima, Tokyo (JP); Shin Hikino, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/498,361

(22) Filed: Feb. 4, 2000

(30) Foreign Application Priority Data

May 10, 1999 (JP) .......................................... 11-129170

(51) Int. Cl.[7] .............................................. H04L 12/28
(52) U.S. Cl. ...................................... 370/505; 370/506
(58) Field of Search ........................... 370/395.64, 476, 370/505, 506, 535, 545; 375/240.01, 240.02, 240.03, 240.23; 725/90, 144–146

(56) References Cited

U.S. PATENT DOCUMENTS

| | | | | |
|---|---|---|---|---|
| 5,267,236 A | * | 11/1993 | Stephenson, Jr. | 370/545 |
| 5,671,226 A | | 9/1997 | Murakami et al. | 370/474 |
| 6,522,671 B1 | * | 2/2003 | Solheim et al. | 370/535 |
| 6,546,051 B2 | * | 4/2003 | Ramaswamy | 375/240.03 |

FOREIGN PATENT DOCUMENTS

| | | |
|---|---|---|
| JP | A1286552 | 11/1989 |
| JP | A779282 | 3/1995 |
| JP | 2000-3241110 A | * 11/2000 .......... H04L/12/28 |

OTHER PUBLICATIONS

Committee T1 Contribution, Draft ANSI Standard, T1A1.5/98–300R3 (1998).

* cited by examiner

*Primary Examiner*—Salvatore Cangialosi
(74) *Attorney, Agent, or Firm*—Birch, Stewart, Kolasch, & LLP.

(57) ABSTRACT

A communication device for transmitting a sequence of data, which is transmitted thereto at a given transmission rate, at a desired transmission rate greater than the former transmission rate over a transmission line. The device comprises a mapping unit, in order to map the sequence of data into a plurality of frames in a predetermined form, each of which consists of a plurality of blocks, for assigning a predetermined amount of data to a data transmission area in each of the plurality of blocks included in each frame so that the sequence of data is nearly-uniformly arranged over the plurality of blocks included in each frame. A control unit is provided for controlling the mapping unit in such a manner that the mapping unit provides a stuff area for a predetermined one of the plurality of blocks included in each frame and determines whether or not to map part of the sequence of data into the stuff area, so as to transmit the plurality of frames at the desired transmission rate, then maps either part of the sequence of data or null data into the stuff area according to a determination result, and provides a stuff present identifier indicating whether or not part of the sequence of data is mapped into the stuff area for each frame.

20 Claims, 13 Drawing Sheets

FIG.4
(a)
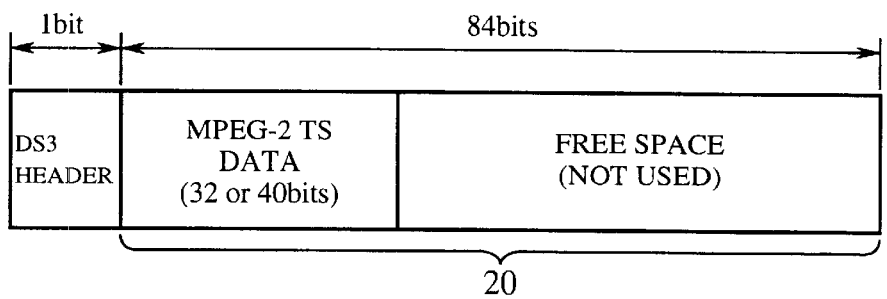
(b)
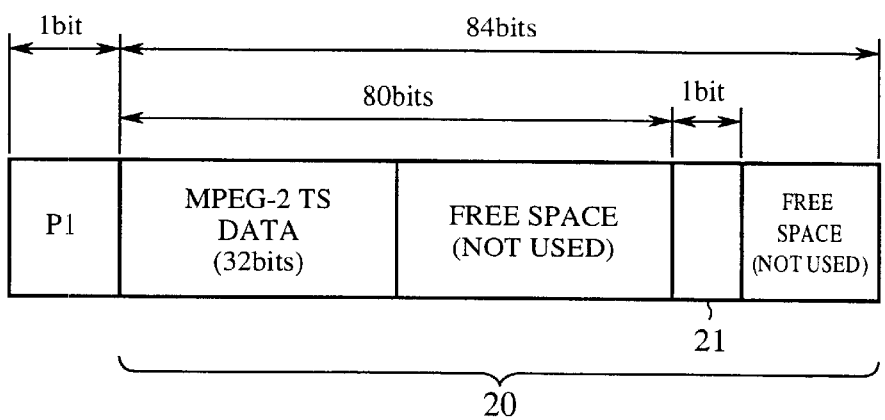
(c)
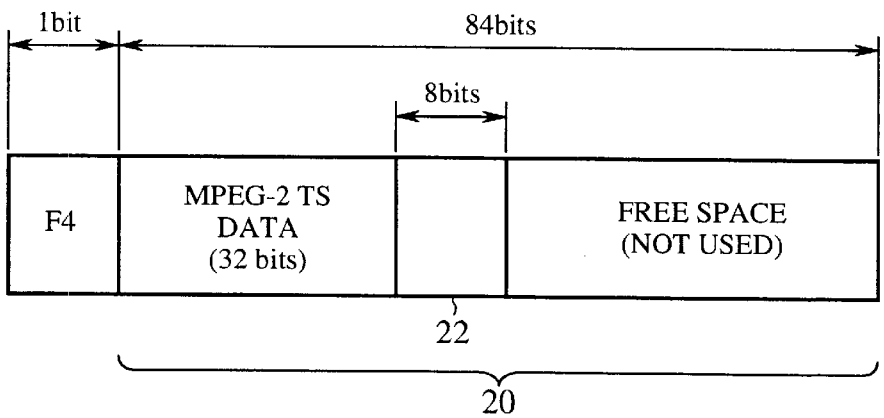

|  |  | BLOCK | | | | | | | |
|---|---|---|---|---|---|---|---|---|---|
|  |  | 1 | 2 | 3 | 4 | 5 | 6 | 7 | 8 |
| SUB-FRAME | 1 | 5 | 4 | 5 | 4 | 5 | 5 | 4 | 5 |
|  | 2 | 4 | 5 | 5 | 4 | 5 | 4 | 5 | 5 |
|  | 3 | 4 | 5 | 4 | 5 | 5 | 4 | 5 | 4 |
|  | 4 | 5 | 5 | 4 | 5 | 4 | 5 | 5 | 4 |
|  | 5 | 5 | 4 | 5 | 5 | 4 | 5 | 4 | 5 |
|  | 6 | 5 | 4 | 5 | 4 | 5 | 5 | 4 | 5 |
|  | 7 | 4 | 5 | 5 | 4 | 5 | 4 | 5 | 4/5 |

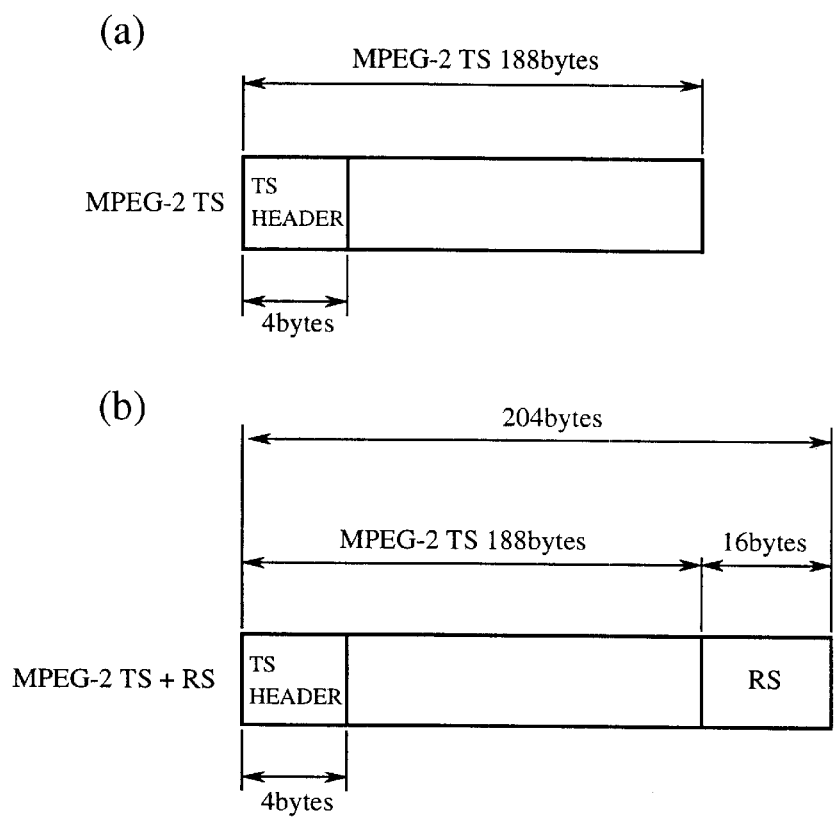

FIG.13

|  |  | BLOCK | | | | | | | |
|---|---|---|---|---|---|---|---|---|---|
|  |  | 1 | 2 | 3 | 4 | 5 | 6 | 7 | 8 |
| SUB-FRAME | 1 | 9 | 9 | 9 | 10 | 9 | 9 | 9 | 9 |
|  | 2 | 10 | 9 | 9 | 9 | 9 | 10 | 9 | 9 |
|  | 3 | 9 | 10 | 9 | 9 | 9 | 9 | 10 | 9 |
|  | 4 | 9 | 9 | 9 | 10 | 9 | 9 | 9 | 10 |
|  | 5 | 9 | 9 | 9 | 9 | 10 | 9 | 9 | 9 |
|  | 6 | 9 | 10 | 9 | 9 | 9 | 10 | 9 | 9 |
|  | 7 | 9 | 9 | 10 | 9 | 9 | 9 | 9 | 9/10 |

FIG.14

|  |  | BLOCK | | | | | | | |
|---|---|---|---|---|---|---|---|---|---|
|  |  | 1 | 2 | 3 | 4 | 5 | 6 | 7 | 8 |
| SUB-FRAME | 1 | 10 | 10 | 10 | 10 | 10 | 10 | 10 | 10 |
|  | 2 | 10 | 10 | 10 | 10 | 10 | 10 | 10 | 10 |
|  | 3 | 10 | 10 | 10 | 10 | 10 | 10 | 10 | 10 |
|  | 4 | 10 | 10 | 10 | 10 | 10 | 10 | 10 | 10 |
|  | 5 | 10 | 10 | 10 | 10 | 10 | 10 | 10 | 10 |
|  | 6 | 10 | 10 | 10 | 10 | 10 | 10 | 10 | 10 |
|  | 7 | 10 | 10 | 10 | 10 | 10 | 10 | 10 | 9/10 |

| A1 | A2 | P11 | Z6 | ATM CELL | |
|----|----|-----|----|----|----|
| A1 | A2 | P10 | Z5 | ATM CELL | |
| A1 | A2 | P9 | Z4 | ATM CELL | |
| A1 | A2 | P8 | Z3 | ATM CELL | |
| A1 | A2 | P7 | Z2 | ATM CELL | |
| A1 | A2 | P6 | Z1 | ATM CELL | |
| A1 | A2 | P5 | X | ATM CELL | |
| A1 | A2 | P4 | B1 | ATM CELL | |
| A1 | A2 | P3 | G1 | ATM CELL | |
| A1 | A2 | P2 | X | ATM CELL | |
| A1 | A2 | P1 | X | ATM CELL | |
| A1 | A2 | P0 | C1 | ATM CELL | TRAILER |

COMMUNICATION DEVICE AND METHOD

BACKGROUND OF THE INVENTION

1. Field of the Invention

The present invention relates to a communication device and method for transmitting a sequence of data applied thereto at a certain transmission rate over a transmission line (or channel) that accommodates a larger transmission rate.

2. Description of the Prior Art

Recent years have seen the increasing use of image communication with the increasing capacity of networks and as image processing techniques grow more sophisticated. Especially, as for images, an image compression technique called MPEG-2, which is defined by International Standard ISO/IEC (International Organization for Standardization/International Electrotechnical Commission) 13,818, springs into wide use. There are two kinds of transmission formats that conform to MPEG-2; program streams (or PS) and transport streams (or TS). Transport streams constructed of 188-byte fixed-length packets come into wide use in transmission media such as satellite digital broadcasting and ground wave digital broadcasting.

In communications, there exist asynchronous transfer mode (or ATM), local area networks (or LAN), dedicated (or leased) lines such as a T1 network and a digital signal level 3 (or DS3) network defined by American National Standards Institute or ANSI, and so on, as transmission lines. How to bear MPEG-2 TS streams over such a communication network (this is referred to as mapping) is an important issue in the use of the communication network for digital TV broadcasting.

Referring next to FIG. 17, there is illustrated a block diagram showing the structure of a prior art communication device and method for mapping MPEG-2 TS streams into DS3 frames and for transmitting them over a DS3 network, which is widely used mainly in North America. In the figure, reference numeral 1 denotes a communication device, numeral 2 denotes an MPEG-2 TS generating device, numeral 19 denotes an MPEG over ATM mapping unit, numeral 20 denotes a physical layer convergence protocol (or PLCP) framing unit, numeral 7 denotes a multiplexer, numeral 8 denotes a line coding unit, and numeral 10 denotes a system control unit for controlling the whole of the communication device 1.

FIG. 18 is a diagram showing a method of mapping MPEG-2 TS streams into ATM cells, and FIG. 19 is a diagram showing the structure of a PLCP frame that is constructed when mapping ATM cells into the DS3 network channel.

In operation, MPEG-2 TS generating device 2 generates. MPEG-2 TS data constructed of 188-byte fixed-length packets based on information from a video source, and then sends out the MPEG-2 TS data to the communication device 1. The MPEG-2 TS data is then furnished to the MPEG over ATM mapping unit 19.

The MPEG over ATM mapping unit 19 divides each 188-byte MPEG-2 TS into four or more parts and then maps each of them into the 48-byte payload of each of four or more ATM cells. This mapping method is defined by Audio/Visual Multimedia Services: Video on Demand v1.1, which is a standard established by ATM Forum that is the ATM LAN standardization group in U.S.A. According to the standard, 384 bytes of data obtained by adding an 8-byte trailer defined by the ATM adaptation layer type 5 (or AAL5) to two MPEG-2 TS packets of 376 bytes is mapped into the payload of eight ATM cells.

Those ATM cells into which MPEG-2 TS data has been mapped in the above-mentioned way are then furnished to the PLCP framing unit 20. The PLCP framing unit 20 performs a PLCP framing operation, as shown in FIG. 19, on the received ATM cells. The PLCP framing method of mapping ATM cells into frames to be transmitted over the DS3 network channel is defined by ATM User-Network Interface Specification V3.1 which is a standard established by ATM Forum. According to the standard, twelve ATM cells are mapped into one PLCP frame to be transmitted at a frame rate of 125 microseconds. The difference between the transmission rate for MPEG-2 TS and that for the DS3 network channel can be adjusted by inserting an idle cell as an ATM cell into each frame.

The multiplexer 7 then multiplexes PLCP frames generated by the PLCP framing unit 20 and a group of DS3 headers generated by the DS3 header generating unit 4 to generate DS3 frames, and then sends out them to the line coding unit 8. Each DS3 frame is 4760 bits in length. And, each DS3 frame has such a frame structure that it is divided into seven 680-bit sub-frames. Furthermore, each of the plurality of sub-frames is constructed of eight 85-bit blocks each of which includes a one-bit DS3 header at the head thereof. The transmission rate for the DS3 network channel is 44.736 Mb/s.

The line coding unit 8 performs a line coding operation on the DS3 frames generated by the multiplexer 7, and then sends out the line coded DS3 frames over the DS3 network channel. As the line coding, a kind of alternate mark inversion (or AMI) coding called bipolar with three zero substitution or B3ZS coding is used. The system control unit 10 controls the whole of the communication device 1.

As previously mentioned, the prior art communication device 1 can map MPEG-2 TS streams into DS3 frames to be transmitted over the DS3 network channel so as to transmit the MPEG-2 TS streams by combining the MPEG over ATM technique with the PLCP framing technique.

A problem with the prior art communication method and device constructed above is that since much time is spent in performing the two steps of mapping MPEG-2 TS data into ATM cells first, and then mapping the ATM cells into PLCP frames, in order to transmit the MPEG-2 TS data over the DS3 network channel, the delay is increased, and the complicated format processing required for carrying out the two steps increase the size of circuitry that implements the communication device.

In addition, mapping MPEG-2 TS data into ATM cells and further mapping them into PCLP frames can increase the overhead for the system, and therefore the transmission rate for MPEG-2 TS data that the network can accommodate is restricted with respect to the transmission band of the network. In other words, the utilization factor of the network is reduced. Since the difference between the transmission rate for MPEG-2 TS and that for the DS3 network channel must be adjusted by inserting an idle cell as an ATM cell into each PLCP frame, MPEG-2 TS data cannot be distributed uniformly with respect to time during the transmission over the DS3 network channel. In other words, there easily cause variations in the transmission of MPEG-2 TS data, such as a burst of data transmission, over the DS3 network channel.

SUMMARY OF THE INVENTION

The present invention is made to overcome the above problems. It is therefore an object of the present invention to provide a communication method and device for mapping a sequence of data, such as MPEG-2 TS data, into frames to be transmitted over a network, such as a DS3 network, the method and device being capable of reducing the delay caused by the mapping, improving the utilization factor of the network, reducing variations in the data rate that can occur during the transmission of MPEG-2 TS data over the network, and reducing the size of the circuitry that implements the communication device.

In accordance with one aspect of the present invention, there is provided a communication method for transmitting a sequence of data, which is transmitted thereto at a given transmission rate, at a desired transmission rate greater than the former transmission rate, the method comprising the steps of: in order to map the sequence of data into a plurality of frames in a predetermined form, each of which consists of a plurality of blocks, assigning a predetermined amount of data to a data transmission area in each of the plurality of blocks included in each frame so that the sequence of data is nearly-uniformly arranged over the plurality of blocks included in each frame; providing a stuff area for a predetermined one of the plurality of blocks included in each frame and determining whether or not to map part of the sequence of data into the stuff area, so as to transmit the plurality of frames at the desired transmission rate; mapping either part of the sequence of data or null data into the stuff area according to a determination done in the determining step; and providing a stuff present identifier indicating whether or not part of the sequence of data is mapped into the stuff area for each frame.

In accordance with a preferred embodiment of the present invention, the stuff present identifier providing step is the step of providing an odd number of stuff present identifiers each indicating whether or not part of the sequence of data is mapped into the stuff area for each frame so that they are distributed in each frame.

In accordance with another preferred embodiment of the present invention, the communication method further comprises the step of adding an error-detecting code to the stuff present identifier.

In accordance with another preferred embodiment of the present invention, the communication method further comprises the step of adding an error-correcting code to the stuff present identifier.

In accordance with another preferred embodiment of the present invention, the communication method further comprises the step of mapping supplemental information on the sequence of data into free space of the data transmission area of at least one of the plurality of blocks included in each frame. Preferably, information on the transmission rate at which the sequence of data to be mapped into the plurality of frames in the predetermined form is transmitted is mapped, as the supplemental information, into the free space. As an alternative, information on the status or characteristics of communication upon transmission of the plurality of frames can be mapped, as the supplemental information, into the free space.

In accordance with another preferred embodiment of the present invention, both the data transmission area of each of the plurality of blocks into which the sequence of data is mapped and the stuff area included in each frame are defined in units of one byte so that the sequence of data is separately mapped into the data transmission area of each of the plurality of blocks included in each frame in units of one byte in the same way that the sequence of data to be mapped into the plurality of frames can be separated in units of one byte.

In accordance with another aspect of the present invention, there is provided a communication device for transmitting a sequence of data, which is transmitted thereto at a given transmission rate, at a desired transmission rate greater than the former transmission rate over a transmission line, the device comprising: a mapping unit, in order to map the sequence of data into a plurality of frames in a predetermined form, each of which consists of a plurality of blocks, for assigning a predetermined amount of data to a data transmission area in each of the plurality of blocks included in each frame so that the sequence of data is nearly-uniformly arranged over the plurality of blocks included in each frame; and a control unit for controlling the mapping unit in such a manner that the mapping unit provides a stuff area for a predetermined one of the plurality of blocks included in each frame and determines whether or not to map part of the sequence of data into the stuff area, so as to transmit the plurality, of frames at the desired transmission rate, then maps either part of the sequence of data or null data into the stuff area according to a determination result, and provides a stuff present identifier indicating whether or not part of the sequence of data is mapped into the stuff area for each frame.

In accordance with a preferred embodiment of the present invention, the control unit controls the mapping unit in such a manner that the mapping unit provides an odd number of stuff present identifiers each indicating whether or not part of the sequence of data is mapped into the stuff area for each frame so that they are distributed in each frame.

In accordance with another preferred embodiment of the present invention, the control unit controls the mapping unit in such a manner that the mapping unit adds an error-detecting code to the stuff present identifier.

In accordance with another preferred embodiment of the present invention, the control unit controls the mapping unit in such a manner that the mapping unit adds an error-correcting code to the stuff present identifier.

In accordance with another preferred embodiment of the present invention, the mapping unit includes supplemental data mapping unit for mapping supplemental information on the sequence of data into free space of the data transmission area of at least one of the plurality of blocks included in each frame. Preferably, the supplemental data mapping unit maps information on the transmission rate at which the sequence of data to be mapped into the plurality of frames in the predetermined form is transmitted, as the supplemental information, into the free space. As an alternative, the supplemental data mapping unit maps information on the status or characteristics of communication upon transmission of the plurality of frames, as the supplemental information, into the free space.

In accordance with another preferred embodiment of the present invention, the mapping unit define both the data transmission area of each of the plurality of blocks into which the sequence of data is mapped and the stuff area in units of one byte so that the sequence of data is separately mapped into the data transmission area of each of the plurality of blocks included in each frame in units of one byte in the same way that the sequence of data to be mapped into the plurality of frames can be separated in units of one byte.

Preferably, the sequence of data is MPEG-2 (Moving Picture Experts Group2) TS (Transport Stream) streams, which are defined by International Standard ISO/IEC (International Organization for Standardization/ International Electrotechnical Commission) 13,818-1.

Preferably, the transmission line is a DS3 (Digital Signal, Level 3) network, which is defined by ANSI (American National Standards Institute).

Further objects and advantages of the present invention will be apparent from the following description of the preferred embodiments of the invention as illustrated in the accompanying drawings.

BRIEF DESCRIPTION OF THE DRAWINGS

FIG. 4(a) is a diagram showing a mapping location of 32-bit or 40-bit part of MPEG-2 TS data within each 84-bit data field of each of eight blocks that constitute each of a plurality of sub-frames included in a DS3 frame as shown in FIG. 3;

FIG. 4(b) is a diagram showing a mapping location of a one-bit stuff present identifier;

FIG. 4(c) is a diagram showing a mapping location of null data or stuff;

FIG. 11(a) is a diagram showing the structure of MPEG-2 TS data;

FIG. 11(b) is a diagram showing the structure of the summation of MPEG-2 TS data and a 16-byte RS code, which is to be handled by a communication device according to a sixth embodiment of the present invention;

FIG. 12 is a table showing the size (in units of bytes) of part of the summation of a 188-byte MPEG-2 TS packet and a 16-byte RS code which is to be mapped into each of a plurality of blocks of each of a plurality of sub-frames included in each DS3 frame, when the communication device according to the sixth embodiment of the present invention maps a sequence of MPEG-2 TS packets, which is transmitted to the communication device at a transmission rate of 19.392658 Mb/s, into DS3 frames, while adding the RS code to each MPEG-2 TS packet;

FIG. 13 is a table showing the size (in units of bytes) of part of MPEG-2 TS data which is to be mapped into each of a plurality of blocks of each of a plurality of sub-frames included in each DS3 frame, when a communication device according to a seventh embodiment of the present invention maps a sequence of MPEG-2 TS data, which is transmitted to the communication device at a transmission rate of 38.785316 Mb/s, into DS3 frames;

FIG. 14 is a table showing the size (in units of bytes) of part of the summation of a 188-byte MPEG-2 TS packet and a 16-byte RS code which is to be mapped into each of a plurality of blocks of each of a plurality of sub-frames included in each DS3 frame, when a communication device according to an eighth embodiment of the present invention maps a sequence of MPEG-2 TS packets, which is transmitted to the communication device at a transmission rate of 38.785316 Mb/s, into DS3 frames while adding the RS code to each MPEG-2 TS packet;

DETAILED DESCRIPTION OF THE PREFERRED EMBODIMENTS

First Embodiment

Figure 1:
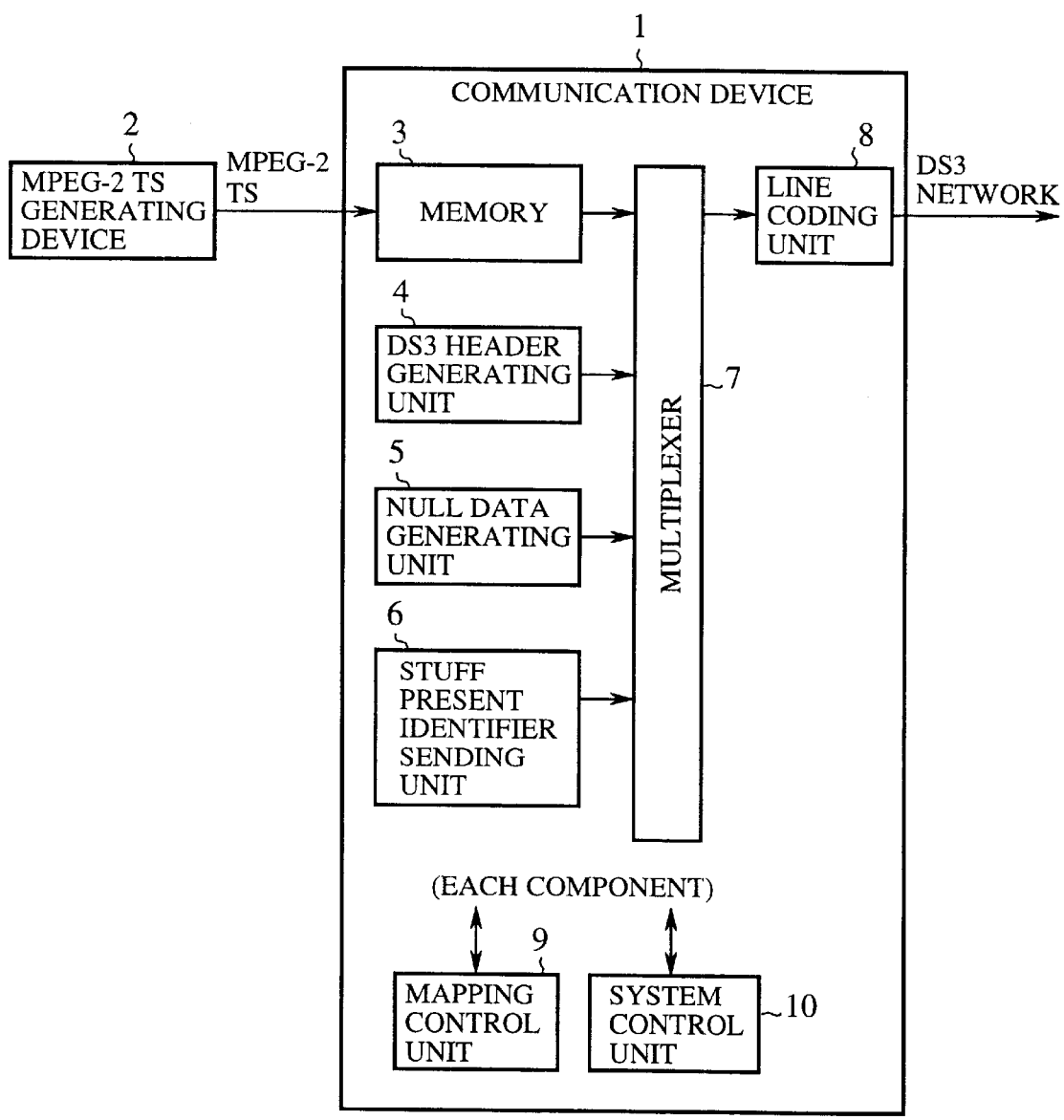
FIG. 1 is a block diagram showing the structure of a communication device according to a first embodiment of the present invention.

Referring next to FIG. 1, there is illustrated a block diagram showing the structure of a communication method and device according to a first embodiment of the present invention. In the figure, reference numeral 1 denotes a communication device, numeral 2 denotes an MPEG-2 TS generating device for converting video information and so on into MPEG-2 transport streams (or TS) comprised of a sequence of data (i.e., a bit string) and for furnishing the MPEG-2 TS data to the communication device 1, numeral 3 denotes a memory for buffering the MPEG-2 TS data from the MPEG-2 TS generating device 2, numeral 4 denotes a DS3 header generating unit for generating a DS3 header, numeral 5 denotes a null data generating unit for generating an null data or stuff to be mapped into a DS3 frame in order to accommodate the difference between the rate of transmitting the MPEG-2 TS data from the MPEG-2 TS generating device 2 to the communication device 1, and the rate of transmitting a sequence of DS3 frames over a DS3 network channel, numeral 6 denotes a stuff present identifier generating unit for generating a stuff present identifier indicating whether each block included with the DS3 frame contains a stuff, numeral 7 denotes a multiplexer for multiplexing various pieces of information from the memory 3, the DS3 header generating unit 4, the null data generating unit 5, and the stuff present identifier generating unit 6 into a DS3 frame, numeral 8 denotes a line coding unit for performing a line coding operation on the DS3 frame from the multiplexer 7, numeral 9 denotes a mapping control unit for controlling the memory 3, the DS3 header generating unit 4, the null data generating unit 5, and the stuff present generating unit 6 so that they sequentially furnish the various pieces of information to the multiplexer 7, and numeral 10 denotes a system control unit for controlling the whole of the communication device 1.

Figure 2:
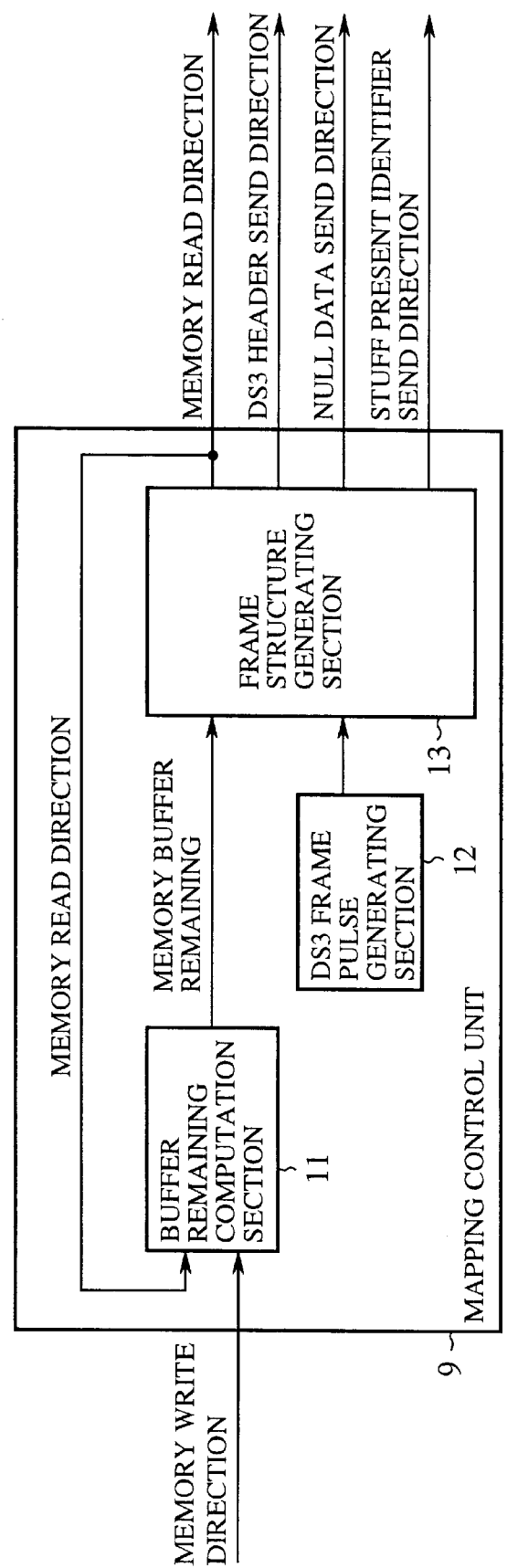
FIG. 2 is a block diagram showing the structure of a mapping control unit of the communication device according to the first embodiment of the present invention.

Referring next to FIG. 2, there is illustrated a block diagram showing the structure of the mapping control unit 9 of the communication device 1 according to the first embodiment of the present invention. In the figure, reference numeral 11 denotes a buffer remaining computation section for computing the remaining amount of the memory 3 by decrementing a counter not shown when receiving a memory write direction from the system control unit 10, and by incrementing the counter when receiving a memory read direction from a frame structure generating section 13, and numeral 12 denotes a DS3 frame pulse generating section for generating a DS3 frame pulse indicating the head of a DS3 frame that is to be produced next. The frame structure generating section 13 structures the next DS3 frame by sequentially directing the memory 3, the DS3 header generating unit 4, the null data generating unit 5, and the stuff present identifier generating unit 6 to furnish various pieces of information to the multiplexer 7.

Figure 3:
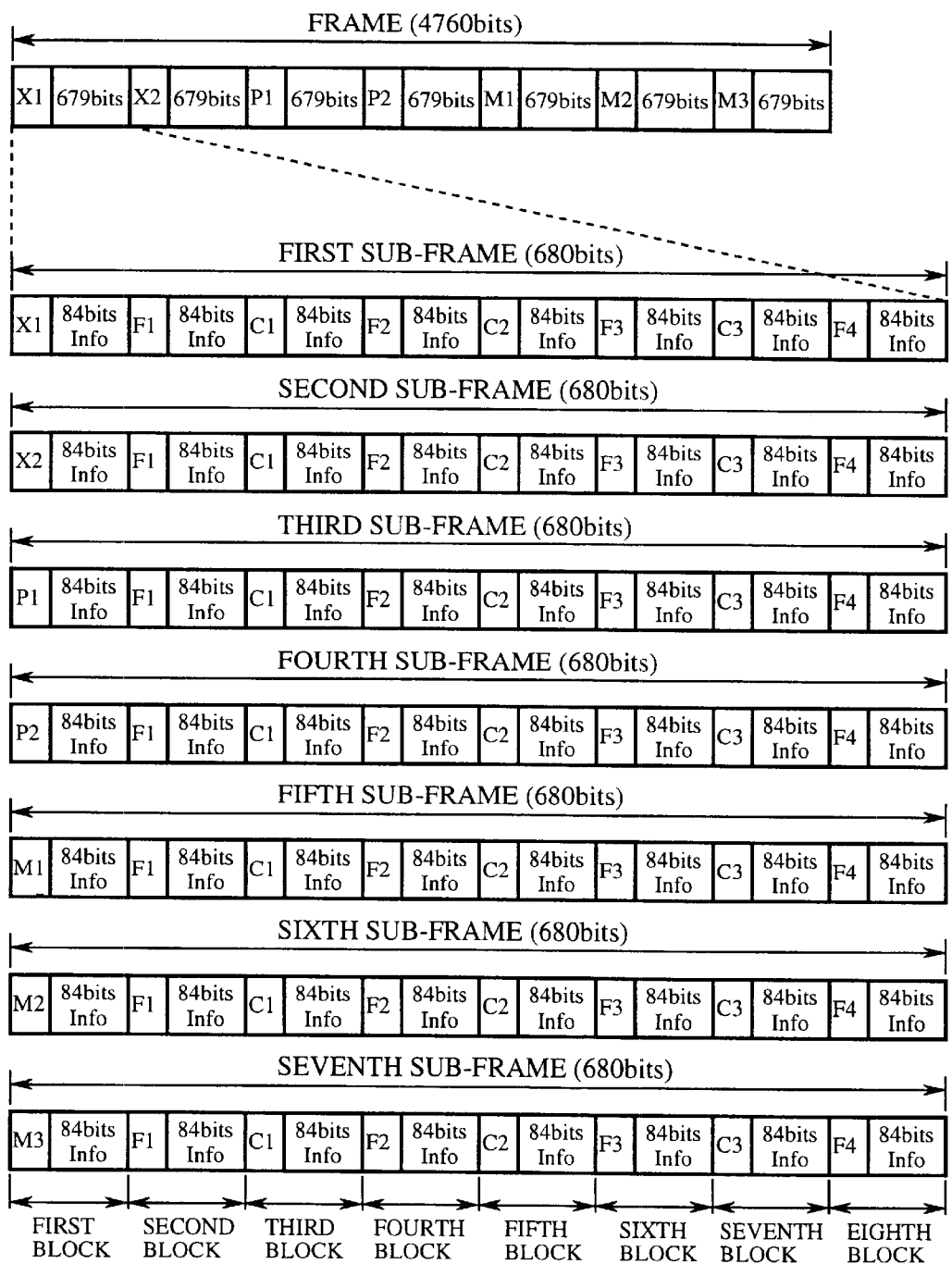
FIG. 3 is a diagram showing the structure of a DS3 frame defined by the ANSI T1.107 standard.

Referring next to FIG. 3, there is illustrated a diagram showing the structure of a DS3 frame defined by the ANSI T1.107 standard, which can be generated from input MPEG-2 TS streams by the communication device 1 according to the first embodiment of the present invention. As shown in FIG. 3, each 4760-bit DS3 frame has such a frame structure that it is divided into seven 80-bit sub-frames. Each of the plurality of sub-frames is constructed of eight 85-bit blocks. Each block includes a one-bit DS3 header (e.g., X1, F1, C1, and so on in the first sub-frame of FIG. 3) at its head. The DS3 header is followed by a data field, titled "84bit Info", into which 84-bit (i.e., 10.5-byte) user data is mapped. In the first embodiment, part of MPEG-2 TS data, a stuff and a stuff present identified, which will be described below in detail, can be mapped into each 84-bit data field.

FIG. 4(a) is a diagram showing a mapping location of 32-bit or 40-bit part of MPEG-2 TS data within each 84-bit data field of each of eight blocks that constitute each sub-frame included in one DS3 frame as shown in FIG. 3. FIG. 4(b) shows a mapping location of a one-bit stuff present identifier, and FIG. 4(c) shows a mapping location of null data or stuff. In these figures, numeral 20 denotes an 84-bit information mapping field into which information can be mapped, numeral 21 denotes a stuff present identifier for indicating the presence or absence of a stuff, and numeral 22 denotes a stuff field.

Figures 5, 6:
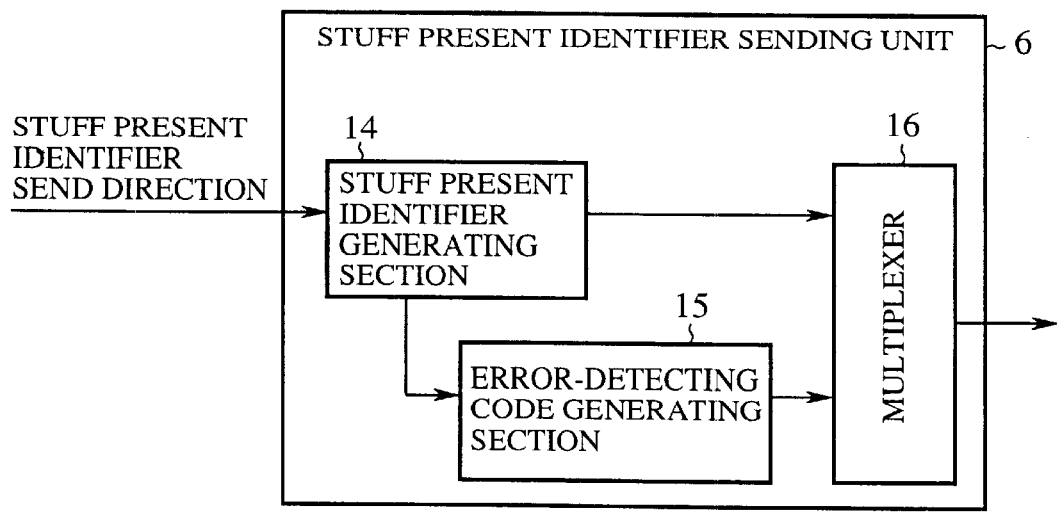
FIG. 5 is a table showing the size (in units of bytes) of part of MPEG-2 TS data which can be mapped into each of the plurality of blocks of each of the plurality of sub-frames included in each DS3 frame, when the communication device according to the first embodiment of the present invention maps the MPEG-2 TS data transmitted thereto at a transmission rate of 19.392658 Mb/s into DS3 frames.
FIG. 6 is a block diagram showing the structure of a stuff present identifier sending unit of a communication device according to a third embodiment of the present invention.

Referring next to FIG. 5, there is illustrated a table showing the size (in units of bytes) of part of MPEG-2 TS data which can be mapped into each of the plurality of blocks of each of the plurality of sub-frames included in each DS3 frame, when mapping the MPEG-2 TS data transmitted to the communication device at a transmission rate of 19.392658 Mb/s into DS3 frames. In the table of FIG. 5, the first through seventh rows running horizontally show the first through seventh sub-frames of each DS3 frame, and the first through eighth columns running vertically show the first through eighth blocks of each of the plurality of sub-frames. "5" in the most upper left-hand box which corresponds to the first block of the first sub-frame indicates that the first 5-byte area of the 10.5-byte (or 84-bit) information mapping field 20 is fixedly assigned to part of MPEG-2 TS data to be mapped into each DS3 frame. In addition, in the next block, i.e., the second block of the first sub-frame, the next 4-byte part of the MPEG-2 TS data is fixedly mapped into the information mapping field 20 of the second block, and in the third block of the first sub-frame, the next 5-byte part of the MPEG-2 TS data is fixedly mapped into the information mapping field 20 of the third block.

In the eighth block of the seventh sub-frame that is the last block of each DS3 frame, 4-byte or 5-byte part of the MPEG-2 TS data is mapped into the information mapping field 20 of the last block according to the status of the transmission of DS3 frames. The last block has a structure as shown in FIG. 4(c). When 4-byte part of the MPEG-2 TS data is mapped into the information mapping field 20 of the last block, the 4-byte MPEG-2 TS data is followed by one-byte null data, which is called stuff or stuff byte. The field into which the stuff is mapped is called stuff field.

The stuff present identifier 21 as shown in FIG. 4(b) is the one that can identify (or determine) whether part of the MPEG-2 TS data or a stuff is mapped into the stuff field 22 as shown in FIG. 4(c). The stuff present identifier 21 can be placed within the information mapping field 20 of the first block of the third sub-frame, for example.

Next, a description will be made as to the operation of the communication device 1 according to the first embodiment of the present invention with reference to FIGS. 1, 2, 3, and 4(a) to 4(c), assuming that the transmission rate for MPEG-2 TS streams is 19.392658 Mb/s equal to the transmission rate for digital broadcasting in U.S.A.

First, the description will be directed to how the communication device 1 multiplexes MPEG-2 TS data transmitted thereto from the MPEG-2 TS generating device 2 at a transmission rate of 19.392658 Mb/s into DS3 frames to be transmitted at a transmission rate of 44.736 Mb/s over a DS3 network channel.

As shown in FIG. 3, in each DS3 frame, a field into which user data, in the first embodiment MPEG-2 TS data from the MPEG-2 TS generating unit 2, can be mapped is the one titled "84-bit Info" (which is called payload) within each block included in each of the plurality of sub-frames of each DS3 frame, i.e., the information mapping field 20 as shown in FIG. 4(a) and so on. Since the transmission rate for the DS3 network channel is 44.736 Mb/s and the payload of one 4,760-bit DS3 frame is 4,704 bits in length, when MPEG-2 TS data is mapped into the payload of 4,760-bit DS3 frames, the transmission rate at which the MPEG-2 TS data is to be transmitted over the DS3 network channel reaches 44.736 Mb/s×4,704/4,760=44.21 Mb/s.

Similarly, when one 2,056-bit (or 257-byte) MPEG-2 TS data is mapped into the payload of one 4,760-bit DS3 frame, the transmission rate at which the MPEG-2 TS data is to be transmitted over the DS3 network channel reaches 44.736 Mb/s×2,056/4,760=19.322945 Mb/s. When one 2,064-bit (or 258-byte) MPEG-2 TS data is mapped into the payload of one 4,760-bit DS3 frame, the transmission rate at which the MPEG-2 TS data is to be transmitted over the DS3 network reaches 44.736 Mb/s×2,064/4,760=19.398131 Mb/s.

Accordingly, when an fixed amount of MPEG-2 TS data is fixedly mapped into certain fields within one DS3 frame, MPEG-2 TS data cannot be transmitted at 19.392658 Mb/s over the 44.736 Mb/s DS3 network channel. To eliminate the difference between the desired transmission rate and each of the estimated values as mentioned above, the communication device 1 according to the first embodiment can map one 257-byte MPEG-2 TS data into one DS3 frame at one time and map other 258-byte MPEG-2 TS data into another DS3 frame at another time to attain the desired transmission rate of 19.392658 Mb/s.

When mapping one 257-byte MPEG-2 TS data into a DS3 frame, the communication device 1 maps one-byte null data into a predetermined area included in the DS3 frame, e.g., the stuff field 22 of the information mapping field 20 of the last block within the seventh sub-frame, as shown in FIG. 4(c). As previously mentioned, the null data is called stuff, or stuff byte in this case because the null data is one byte in length. As shown in FIG. 4(b), the one-bit stuff present identifier 21 for indicating whether or not the stuff is mapped into the DS3 frame is placed in the information mapping field of a predetermined block (e.g., the first block of the third sub-frame of the DS3 frame) together with part of MPEG-2 TS data.

As previously mentioned, when transmitting MPEG-2 TS data at the desired transmission rate of 19.392658 Mb/s over the DS3 network channel, the communication device 1 performs data transmission by combining transmission of a DS3 frame into which one 257-byte MPEG-2 TS data is mapped and transmission of another DS3 frame into which other 258-byte MPEG-2 TS data is mapped. FIG. 5 shows an example of the mapping done for attaining the desired transmission rate. As previously mentioned, "4" or "5" in each box of the table of FIG. 5, except the last block of the seventh sub-frame, represents the number of bytes of part of MPEG-2 TS data that can be mapped into the information mapping field 20 of each of the plurality of blocks within each sub-frame. In only the box of the table corresponding to the last block of the seventh sub-frame, "4/5" is shown. This indicates that 4-byte or 5-byte part of MPEG-2 TS data is mapped into the information mapping field 20 of the last block of the seventh sub-frame. Thus, when 4-byte part of MPEG-2 TS data is mapped into the last block of the seventh sub-frame included in a DS3 frame, the total number of bytes of MPEG-2 TS data that is mapped into the DS3 frame is 257 bytes. In contrast, when 5-byte part of MPEG-2 TS data is mapped into the last block of the seventh sub-frame included in a DS3 frame, the total number of bytes of one MPEG-2 TS data that is mapped into the DS3 frame is 258 bytes.

As previously mentioned, FIG. 4(b) shows a location in a predetermined block where the stuff present identifier 21 is mapped, and is an enlarged view of the first block of the third sub-frame as shown in FIG. 3. In the first embodiment, since the stuff that can be inserted into a DS3 frame is one byte in length, only one stuff present identifier 21 is placed within the DS3 frame, as previously explained. For example, the stuff present identifier 21 can be located at the 81-th bit, as shown in FIG. 4(b), of the information mapping field of the predetermined block.

Next, a description will be made as to a concrete flow of data within the communication device 1 and the operation of the communication device 1. First, the MPEG-2 TS generating device 2 generates a sequence of data comprised of a plurality of 188-byte MPEG2 TS packets based on information from a video source and then sends out the sequence of data to the communication device 1. When the communication device 1 receives the MPEG-2 TS data from the MPEG-2 TS generating device 2, it buffers the received MPEG-2 TS data into the memory 3. After that, the multiplexer 7 multiplexes the MPEG-2 TS data, which is sequentially read out of the memory 3 according to memory read directions from the mapping control unit 9, and DS3 headers and so on into DS3 frames, and then furnishes them to the line coding unit 8.

The DS3 header generating unit 4 generates and sends out a DS3 header to the multiplexer 7 every time it receives a DS3 header send direction from the mapping control unit 9. Similarly, the null data generating unit 5 generates and sends out null data to the multiplexer 7 every time it receives a null data send direction from the mapping control unit 9, and the stuff present identifier generating unit 6 generates and sends out a stuff present identifier to the multiplexer 7 every time it receives a stuff present identifier send direction from the mapping control unit 9.

As previously mentioned, the multiplexer 7 then multiplexes those pieces of information and the MPEG-2 TS data, which is read out of the memory 3, into DS3 frames and delivers the DS3 frames to the line coding unit 8. Then the line coding unit 8 sequentially performs a line coding operation on the received DS3 frames, and sequentially sends out the coded DS3 frames onto the DS3 network channel. The system control unit 10 controls the whole of the communication device 1.

Next, a description will be made as to the operation of the mapping control unit 9 during the above-mentioned multiplexing process. The DS3 frame pulse generating unit 12 generates a DS3 frame pulse that is a reference signal used to generate each DS3 frame. A DS3 frame pulse indicates the head of each DS3 frame to be produced. The frame structure generating unit 13 then sends out a memory read direction signal, a DS3 header send direction signal, a null data send direction signal, a stuff present identifier send direction signal to the memory 3, the DS3 header generating unit 4, the null data generating unit 5, and the stuff present identifier generating unit 6, respectively, in response to the DS3 frame pulse generated by the DS3 frame pulse generating unit 12. In this manner, the mapping control unit 9 organizes the basic structure of each DS3 frame to be sent out. The mapping control unit 9 can perform the control operation in units of one byte.

On the other hand, the mapping control unit 9 determines whether it should map one stuff byte into the stuff field 22 of the information mapping field 20 of the eighth block of the seventh sub-frame, which is the last block included in each DS3 frame, according to the remaining buffer amount of the memory 3. In other words, when generating each DS3 frame in units of one byte, the mapping control unit 9 computes the remaining amount of buffer by means of the buffer remaining amount computation unit 11, and then maps one stuff byte into the stuff field 22 of the information mapping field 20 of the last block when the remaining amount of buffer is less than a predetermined threshold value, and maps only part of MPEG-2 TS data buffered in the memory 3 into the last block when the remaining amount of buffer is equal to or greater than the predetermined threshold value.

To be more specific, the buffer remaining amount computation unit 11 sends out information on the remaining amount of buffer to the frame structure generating unit 13. When the remaining amount of buffer is less than the predetermined threshold value, the frame structure generating unit 13 then furnishes the null data send direction to the null data generating unit 5 to insert one stuff byte into the stuff field 22 of the information mapping field 20 of the last block upon the mapping of the corresponding one-byte data into the last block, and directs the stuff present identifier generating unit 6 to send out a stuff present identifier indicating the presence of the stuff. In contrast, when the remaining amount of buffer is equal to or greater than the predetermined threshold value, the frame structure generating unit 13 then furnishes the memory read direction to the memory 3 to insert one-byte part of MPEG-2 TS data into the stuff field 22 of the information mapping field 20 of the last block, and directs the stuff present identifier generating unit 6 to send out a stuff present identifier indicating the absence of the stuff. The stuff present identifier generating unit 6 maps the stuff present identifier into a location, as shown in FIG. 4(*b*), within the first block of the third sub-frame into which P1 is mapped as the DS3 header, for example.

As previously explained, the communication device 1 according to the first embodiment of the present invention can directly map MPEG-2 TS data into DS3 frames with the above-mentioned simplified processes, thus decreasing the size of the circuitry that implements the communication device. In addition, since the communication device 1 of the first embodiment does not need two-steps mapping processing, unlike the above-mentioned prior art communication device, the delay due to the mapping can be reduced.

Furthermore, since the communication device 1 can map MPEG-2 TS data into DS3 frames in units of one byte, it can transmit the MPEG-2 TS data so that the MPEG-2 TS data is distributed uniformly with respect to time. As a result, variations in the transmission of MPEG-2 TS data, such as a burst of data transmission, can be reduced. In addition, the delay due to buffering can be reduced.

The communication device 1 of the first embodiment can map MPEG-2 TS data into DS3 frames without mapping the MPEG-2 TS data into ATM cells and further mapping a number of ATM cells into each of a plurality of PLCP frames. Accordingly, the overhead for the system can be reduced, and therefore the transmission band of the network can be effectively utilized. In other words, the utilization factor of the network can be improved.

Since the communication device 1 of the first embodiment can map MPEG-2 TS data into DS3 frames in units of one byte and assign one-byte area to the stuff field 22, the concrete circuitry can be easily implemented.

Numerous variants may be made in the exemplary embodiment shown. It is apparent that the stuff present identifier can be mapped in a block rather than the first block of the third sub-frame. In this case, the same advantages are provided.

It is also clear that the stuff present identifier can be placed at another bit of either the first block of the third sub-frame or another block rather than the 82-th bit of the first block of the third sub-frame, as shown in FIG. 4(*b*). Even in this case, the same advantages are provided.

Instead of MPEG-2 TS data, a sequence of data in another format can be mapped into DS3 frames. In this case, the same advantages are provided. The transmission line over which input bit strings are to be transmitted can be a network of another type other than a DS3 network. Even in this case, the same advantages are offered.

The transmission rate for MPEG-2 TS data can be other than 19.392658 Mb/s. Even in this case, the same advantages are offered.

Instead of mapping MPEG-2 TS data into a plurality of blocks included in each of DS3 frames so that the first 5-byte part of the MPEG-2 TS data is mapped into the first block of the first sub-frame, the next 4-byte part of the MPEG-2 TS data is mapped into the second block of the first sub-frame, the next 5-byte part of the MPEG-2 TS data is mapped into the third block of the first sub-frame, . . . , as shown in FIG. 5, the communication device 1 can map the MPEG-2 TS data into each of DS3 frames according to another mapping pattern so that the total number of bytes of MPEG-2 TS data mapped into a DS3 frame is identical with or close to that of MPEG-2 TS data mapped into another DS3 frame. Even in this case, the same advantages are offered. For example, instead of mapping MPEG-2 TS data into a plurality of blocks included in each of DS3 frames so that the first 5-byte part of the MPEG-2 TS data is mapped into the first block of the first sub-frame, the next 4-byte part of the MPEG-2 TS data is mapped into the second block of the first sub-frame, the next 5-byte of the MPEG-2 TS data is mapped into the third block of the first sub-frame, . . . , the communication device 1 can map the MPEG-2 TS data into each of DS3 frames so that the first 4-byte part of the MPEG-2 TS data is mapped into the first block of the first sub-frame, the next 5-byte part of the MPEG-2 TS data is mapped into the second block of the first sub-frame, the next 5-byte part of the MPEG-2 TS data is mapped into the third block of the first sub-frame, . . . As an alternative, the communication device 1 can map the MPEG-2 TS data into each of DS3 frames so that the first 4-byte part of the MPEG-2 TS data is mapped into the first block of the first sub-frame, the next 4-byte part of the MPEG-2 TS data is mapped into the second block of the first sub-frame, the next 5-byte part of the MPEG-2 TS data is mapped into the third block of the first sub-frame, . . . Alternatively, the communication device 1 can map the MPEG-2 TS data into each of DS3 frames so that the first 5-byte part of the MPEG-2 TS data is mapped into the first block of the first sub-frame, the next 5-byte part of the MPEG-2 TS data is mapped into the second block of the first sub-frame, the next 5-byte part of the MPEG-2 TS data is mapped into the third block of the first sub-frame, . . . As an alternative, the communication device 1 can map the MPEG-2 TS data into each of DS3 frames so that the first 5-byte part of the MPEG-2 TS data is mapped into the first block of the first sub-frame, the next 4-byte part of the MPEG-2 TS data is mapped into the second block of the first sub-frame, the next 6-byte part of the MPEG-2 TS data is mapped into the third block of the first sub-frame, . . . In either of those cases, the same advantages are provided.

In another variant of the first embodiment, instead of mapping input MPEG-2 TS data into DS3 frames in units of one byte, the communication device 1 of the first embodiment can input MPEG-2 TS data into DS3 frames in other units. Even in this case, similar advantages can be offered. It is further clear that the stuff field 22 has a certain length other than one byte. In this case, similar advantages can be offered.

Second Embodiment

In contrast to the communication device 1 according to the first embodiment that provides one stuff present identifier for one stuff and hence each DS3 frame, a communication device according to a second embodiment can provide an odd number of stuff present identifiers for each DS3 frame so that the plurality of stuff present identifiers can be distributed within each DS3 frame. The plurality of stuff present identifiers are fixedly placed within the transmission areas or information mapping fields of a plurality of different blocks whose number is equal to that of stuff present identifiers, respectively. Thus the receiver that receives the DS3 frames from the communication device can determine whether each received DS3 frame includes a stuff by determining the value of the plurality of stuff present identifiers included with each DS3 frame based on majority rule. The communication device 1 according to the second embodiment of the present invention has the same structure as the communication device according to the first embodiment as shown in FIGS. 1 and 2, and therefore the description of the structure of the communication device 1 can be omitted hereinafter. Further, assume that each DS3 frame has a structure as shown in FIGS. 3 and 4(*a*) to 4(*c*).

Next, a description will be made as to the operation of the communication device of the second embodiment.

Basically, the communication device of the second embodiment operates in the same way that the communication device of the first embodiment does, and therefore the description will be directed to only the difference between the operation of the communication device of the second embodiment and that of the communication device of the first embodiment.

The communication device 1 of the first embodiment places one stuff present identifier 21 as shown in FIG. 4(b) in the first block of the third sub-frame. In contrast, the communication device 1 of the second embodiment can place three stuff present identifiers 21 as shown in FIG. 4(b) in three predetermined blocks such as the first block of the third sub-frame, the first block of the fifth sub-frame, and the first block of the seventh sub-frame, respectively.

In the communication device 1 according to the second embodiment, a frame structure generating section 13 of a mapping control unit 9 sends out a stuff present identifier send direction to a stuff present identifier generating unit 6 each time the communication device generates each of the first block of the third sub-frame, the first block of the fifth sub-frame, and the first block of the seventh sub-frame. As a matter of course, the stuff present identifier generating unit 6 inserts stuff present identifiers 21 having the same value (e.g., indicating the presence of the stuff, in the case that the stuff is present) into the three locations within each DS3 frame, respectively.

In order for the receiver to determine whether each received DS3 frame includes a stuff by determining the value of the plurality of stuff present identifiers 21 included with each DS3 frame based on majority rule, the number of stuff present identifiers 21 has to be odd such as 3. Further, to eliminate reverse effects due to burst errors that can occur during transmission of DS3 frames, it is desirable that the plurality of stuff present identifiers 21 are arranged within each DS3 frame so that they are apart from one another rather than close to one another.

For example, when the three stuff present identifiers 21 are designated by S1, S2, and S3, respectively, each of them is set to zero if it indicates the presence of the stuff and is set to one if it indicates the absence of the stuff. Thus, in the communication device 1 that is the sender of DS3 frames, the three stuff present identifiers S1, S2, and S3 are set as follows:

In the case of the presence of the stuff, S1=S2=S3=0;
In the case of the absence of the stuff, S1=S2=S3=1.

The receiver determines whether each received DS3 frame includes a stuff by determining the value of the three stuff present identifiers S1, S2, and S3 included with each DS3 frame based on majority rule in the following manner. When S1=S3=1 and S2=0, for example, the receiver can determine the value of the three stuff present identifiers S1, S2, and S3 included with each received DS3 frame as one based on majority rule because the DS3 frame has two stuff present identifiers of one and one stuff present identifier of zero. As a result, the receiver determines that the received DS3 frame includes no stuff.

In general, since it can be assumed that the three stuff present identifiers 21 have the same value, the receiver can determine the presence or absence of the stuff by determining whether any one of the three stuff present identifiers 21 is one or zero. However, this can result in uncertainty in determining whether each received DS3 frame includes the stuff if the checked stuff present identifier 21 has an error. In contrast, the communication device 1 according to the second embodiment can provide an odd number of stuff present identifiers 21 for each DS3 frame to be transmitted. Accordingly, the receiver can precisely determine the presence or absence of the stuff by determining the value of the plurality of stuff present identifiers 21 included with each received DS3 frame based on majority rule even though an error occurs in any one of the plurality of stuff present identifiers 21 during transmission of each DS3 frame.

As can be seen from the above description, the second embodiment offers the following advantages in addition to the advantages provided by the above-mentioned first embodiment.

Since the communication device 1 according to the second embodiment provides an odd number of stuff present identifiers 21 for each frame to be transmitted in a predetermined format, such as a DS3 frame. The plurality of stuff present identifiers 21 are fixedly placed within the transmission areas or information mapping fields 20 of a plurality of different blocks whose number is equal to that of stuff present identifiers, respectively, so that the plurality of stuff present identifiers 21 are distributed within each DS3 frame. Thus the receiver can precisely determine whether each received DS3 frame includes stuff by determining the value of the plurality of stuff present identifiers included with each DS3 frame based on majority rule. Accordingly, the second embodiment offers the advantage of being able to reduce the possibility of wrong determination of the presence or absence of the stuff due to errors that can occur during transmission of frames over the network.

Numerous variants may be made in the exemplary embodiment shown. It is apparent that instead of providing three stuff present identifiers 21 for each DS3 frame to be transmitted, the communication device 1 can provide five or more stuff present identifiers 21, the number of which is odd, for each DS3 frame to be transmitted. In this case, the same advantages are provided.

In the second embodiment, the three stuff present identifiers 21 disposed within each DS3 frame are mapped into the first block of the third sub-frame, the first block of the fifth sub-frame, and the first block of the seventh sub-frame, respectively, as previously mentioned. As an alternative, the three stuff present identifiers 21 disposed within each DS3 frame can be mapped into other different blocks, respectively. Even in this case, the same advantages are provided.

In a variant, each of the three stuff present identifiers 21 within each DS3 frame can be constructed of a plurality of bits. The variant can offer the same advantages. In this case, the receiver can further determine the value of each of the plurality of stuff present identifiers 21 included with each DS3 frame, by determining whether one or zero is in a majority for all the bits of each of the plurality of stuff present identifiers 21. This variant can offer the same advantages.

Third Embodiment

A communication device according to a third embodiment of the present invention can add an error-detecting code to a stuff present identifier 21 provided in each DS3 frame before transmitting each DS3 frame. The communication device according to the third embodiment has the same structure as that of the above-mentioned first embodiment as shown in FIGS. 1 and 2, and therefore the description of the structure will be omitted hereinafter. Each DS3 frame can have a structure as shown in FIG. 3.

Figure 7:
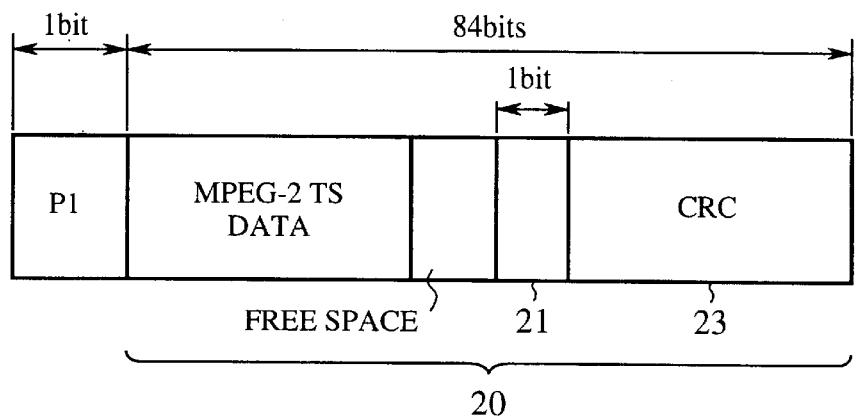
FIG. 7 is a diagram showing the structure of a block in to which both a stuff present identifier and an error-detecting code are mapped.

Referring next to FIG. 6, there is illustrated a block diagram showing the structure of a stuff present identifier sending unit 6 of the communication device 1 according to the third embodiment. In the figure, reference numeral 14 denotes a stuff present identifier generating section for generating a stuff present identifier 21, numeral 15 denotes an error-detecting code generating section for generating an error-detecting code or EDC (e.g., cyclic redundancy check (CRC) code) to be added to the generated stuff present identifier 21, and numeral 16 denotes a multiplexer for multiplexing the stuff present identifier 21 from the stuff present identifier generating section 14 and the error-detecting code 23 from the error-detecting code generating section 15. FIG. 7 shows locations where the stuff present identifier 21 and the error-detecting code 23 are mapped, and is an enlarged view of the first block of the third sub-frame as shown in FIG. 3.

Next, a description will be made as to the operation of the communication device of the third embodiment. Basically, the communication device of the third embodiment operates in the same way that the communication device of the first embodiment does, and therefore the description will be directed to only the difference between the operation of the communication device of the third embodiment and that of the communication device of the first embodiment.

In the above-mentioned first and second embodiments, the stuff present identifier sending unit 6 simply generates and sends out at least a stuff present identifier 21 according to a stuff present identifier send instruction from a frame structure generating unit 13. In contrast, in addition to generating and furnishing a stuff present identifier 21 to the error-detecting code generating section 15 according to a stuff present identifier send instruction from the frame structure generating unit 13 by means of the stuff present identifier generating section 14, the stuff present identifier sending unit 6 of the communication device 1 according to the third embodiment can generate and furnish an error-detecting code 23 to the multiplexer 16 based on the stuff present identifier 21 by means of the error-detecting code generating section 15. The multiplexer 16 then multiplexes the stuff present identifier 21 from the stuff present identifier generating section 14 and the error-detecting code 23 from the error-detecting code generating section 15, and furnishes the multiplexed stuff present identifier and error-detecting code to the first multiplexer 7. As a result, a block as shown in FIG. 7 is produced.

As can be seen from the above description, the third embodiment offers the following advantages in addition to the advantages provided by the above-mentioned first and second embodiments. In addition to providing at least a stuff present identifier 21 for each DS3 frame, the communication device 1 according to the second embodiment can add an error-detecting code 23 to the stuff present identifier 21. As a result, the receiver can easily check the validity of the stuff present identifier 21, thus precisely determining the presence or absence of a stuff.

Numerous variants may be made in the exemplary embodiment shown. For example, it is apparent that the stuff present identifier generating section 14 can generate a stuff present identifier 21 constructed of a plurality of bits instead of a one-bit stuff present identifier, and the error-detecting code generating section 15 can add an error-detecting code 23 to the multiple-bit stuff present identifier 21. Even in this case, the same advantages are provided.

Although the concrete structure of the error-detecting code 23 to be added to each stuff present identifier 21 is not explained in the above description, the error-detecting code 23 can have any form as long as it has an error-detecting function. Even in this case, the same advantages are provided.

Fourth Embodiment

A communication device according to a fourth embodiment of the present invention can add an error-correcting code to a stuff present identifier 21 provided in each DS3 frame before transmitting each DS3 frame. The communication device according to the fourth embodiment has the same structure as that of the above-mentioned first embodiment as shown in FIGS. 1 and 2, and therefore the description of the structure will be omitted hereinafter. Each DS3 frame can have a structure as shown in FIG. 3.

Figure 8:
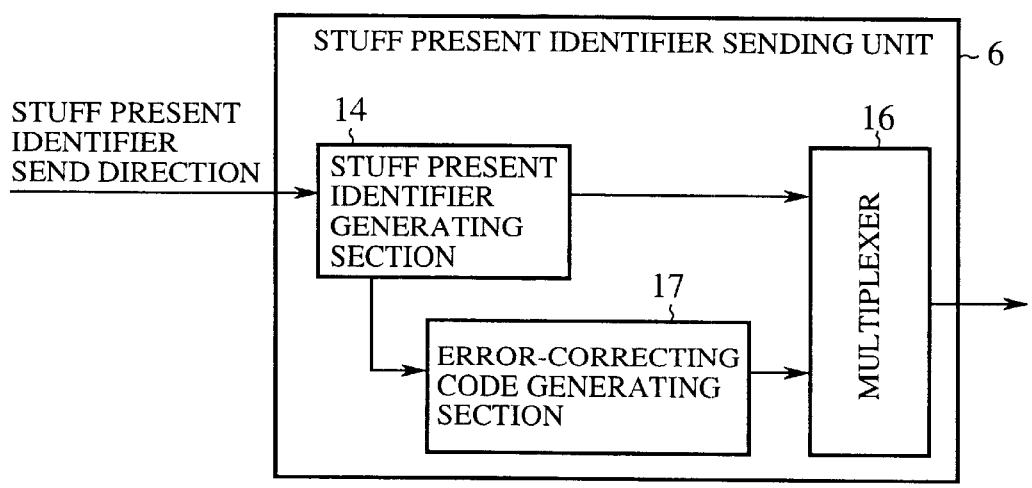
FIG. 8 is a block diagram showing the structure of a stuff present identifier sending unit of a communication device according to a fourth embodiment of the present invention.
Figure 9:
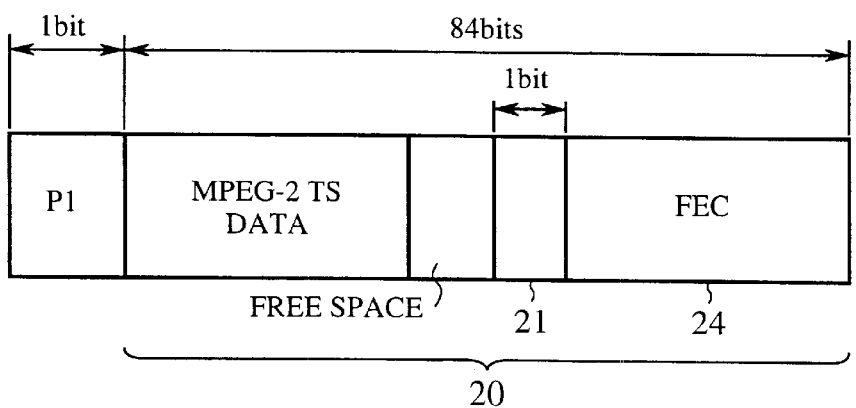
FIG. 9 is a diagram showing the structure of a block in to which both a stuff present identifier and an error-correcting code are mapped.

Referring next to FIG. 8, there is illustrated a block diagram showing the structure of a stuff present identifier sending unit 6 of the communication device 1 according to the fourth embodiment. In the figure, reference numeral 14 denotes a stuff present identifier generating section for generating a stuff present identifier 21, numeral 17 denotes an error-correcting code generating section for generating an error-correcting code or ECC (e.g., forward error correction (FEC) code) to be added to the generated stuff present identifier 21, and numeral 16 denotes a multiplexer for multiplexing the stuff present identifier 21 from the stuff present identifier generating section 14 and the error-correcting code 24 from the error-correcting code generating section 17. FIG. 9 shows locations where the stuff present identifier 21 and the error-correcting code 24 are mapped, and is an enlarged view of the first block of the third sub-frame as shown in FIG. 3.

Next, a description will be made as to the operation of the communication device of the fourth embodiment. Basically, the communication device of the fourth embodiment operates in the same way that the communication device of the first embodiment does, and therefore the description will be directed to only the difference between the operation of the communication device of the fourth embodiment and that of the communication device of the first embodiment.

In the above-mentioned first and second embodiments, the stuff present identifier sending unit 6 simply generates and sends out at least a stuff present identifier 21 according to a stuff present identifier send instruction from a frame structure generating unit 13. In contrast, in addition to generating and furnishing a stuff present identifier 21 to the error-correcting code generating section 17 according to a stuff present identifier send instruction from the frame structure generating unit 13 by means of the stuff present identifier generating section 14, the stuff present identifier sending unit 6 of the communication device 1 according to the fourth embodiment can generate and furnish an error-correcting code 24 to the multiplexer 16 based on the stuff present identifier 21 by means of the error-correcting code generating section 15. The multiplexer 16 then multiplexes the stuff present identifier 21 from the stuff present identifier generating section 14 and the error-correcting code 24 from the error-correcting code generating section 17, and furnishes the multiplexed stuff present identifier and error-correcting code to the first multiplexer 7. As a result, a block as shown in FIG. 9 is produced.

As can be seen from the above description, the fourth embodiment offers the following advantages in addition to the advantages provided by the above-mentioned first and second embodiments. In addition to providing at least a stuff present identifier 21 for each DS3 frame, the communication device 1 according to the second embodiment can add an error-correcting code 24 to the stuff present identifier 21. As a result, the receiver can easily check the validity of the stuff present identifier 21, thus precisely determining the presence or absence of a stuff.

Numerous variants may be made in the exemplary embodiment shown. For example, it is apparent that the stuff present identifier generating section 14 can generate a stuff present identifier 21 constructed of a plurality of bits instead of a one-bit stuff present identifier, and the error-correcting code generating section 17 can add an error-correcting code 24 to the multiple-bit stuff present identifier 21. Even in this case, the same advantages are provided.

Although the concrete structure of the error-correcting code 23 to be added to each stuff present identifier 21 is not explained in the above description, the error-correcting code 23 can have any form as long as it has an error-detecting function. Even in this case, the same advantages are provided.

Fifth Embodiment

Figure 10:
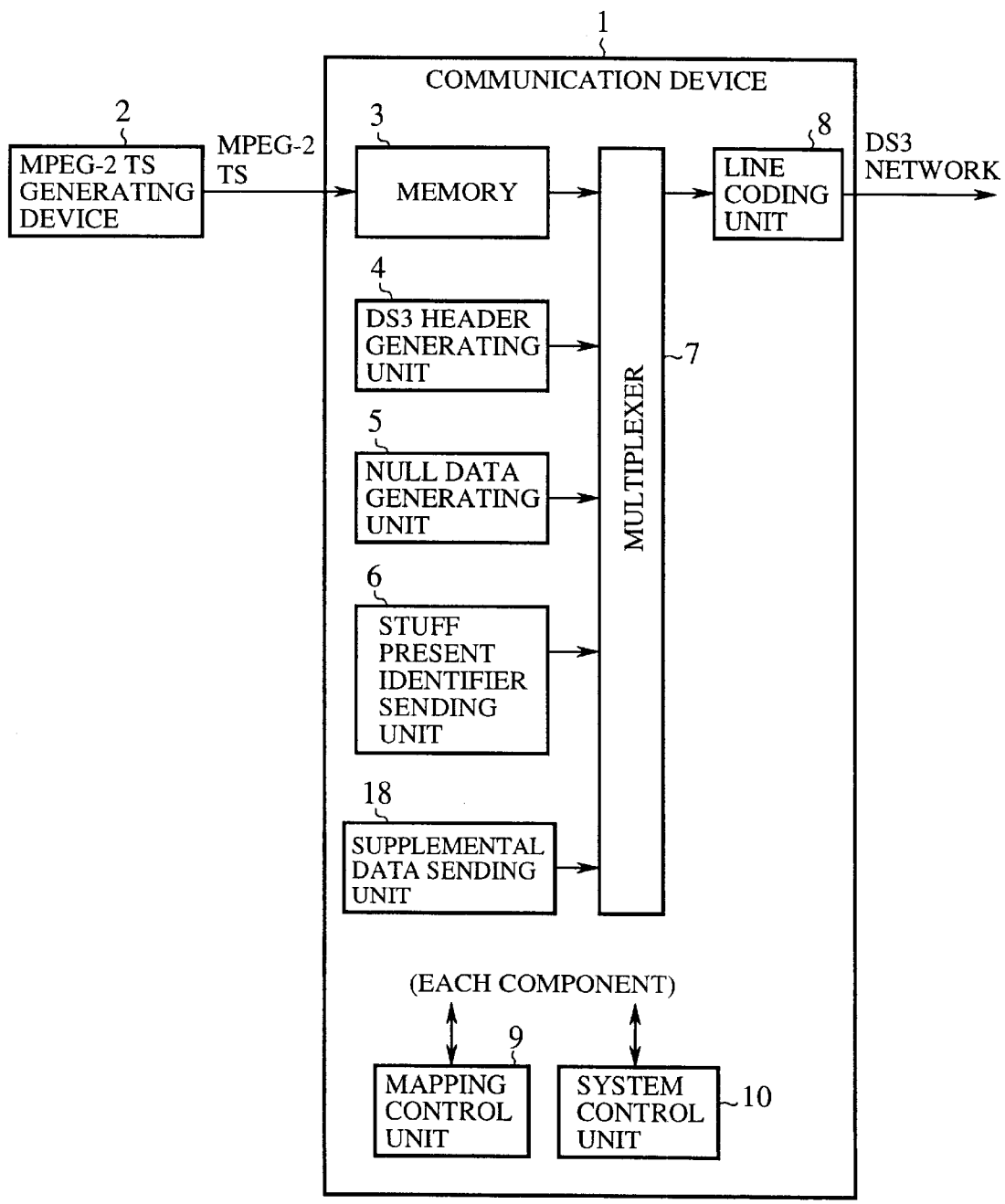
FIG. 10 is a block diagram showing the structure of a communication device according to a fifth embodiment of the present invention.

Referring next to FIG. 10, there is illustrated a block diagram showing the structure of a communication device according to a fifth embodiment of the present invention. In the figure, the same reference numerals as shown in FIG. 1 denote the same components as of the communication device according to the above-mentioned first embodiment, and therefore the description of the components will be omitted hereinafter. In FIG. 10, reference numeral 18 denotes a supplemental information sending unit for generating and sending out supplement data that is supplemental information on MPEG-2 TS data bit strings from an MPEG-2 TS generating device 2 using free space in a transmission line, i.e., DS3 frames. Each DS3 frame can have a structure as shown in FIG. 3. A mapping control unit 9 can have a structure similar to that of the mapping control unit of the communication device according to the first embodiment as shown in FIG. 2, with the exception that it includes a frame structure generating section 13 that can further send out a supplemental data send direction to the supplemental data sending section 18 in addition to other directions.

The communication device 1 according to the fifth embodiment is so constructed as to transmit information on the status or characteristics of transmission of frames, such as information on the transmission rate for MPEG-2 TS data, and mode information such as information on error-detecting or correcting functionality, as supplemental information or data, through free space in the transmission line.

In general, desired data cannot be transmitted from the sender to the receiver as intended unless they share the same information on the transmission rate for bit strings, such as MPEG-2 TS data, mapped into each frame to be transmitted, such as a DS3 frame, and on mode information such as information on error-detecting or correcting functionality, as each other in advance of the transmission. Conventionally, a method of fixedly determining or determining by telephone that the system is made to run in a given mode, in advance of the transmission, has been used as a method of transmitting such supplemental information. The transmission of the supplemental information can be generally implemented through an out-band, which is a network channel other than that used for transmitting data such as MPEG-2 TS data.

The communication device 1 according to the fifth embodiment can carry out the transmission of the supplemental information through free space within an information mapping field 20, as shown in FIG. 4. The supplemental information can be mapped into free space within at least an arbitrary block included in each DS3 frame. The number of blocks used for the transmission of the supplemental information is determined by the amount of the supplemental information. For example, the supplemental information is mapped into the first block of the third sub-frame as shown in FIG. 4(b). To be more specific, either the free space within the 80-bit forward part of the information mapping field 20 or the free space behind the stuff present identifier 21 is used to transmit the supplemental information.

Next, a description will be made as to the operation of the communication device of the fifth embodiment. Basically, the communication device of the fifth embodiment operates in the same way that the communication device of the first embodiment does, and therefore the description will be directed to only the difference between the operation of the communication device of the fifth embodiment and that of the communication device of the first embodiment.

A system control unit 10 transfers supplemental information to be transmitted as the supplemental data to both the supplemental data sending unit 18 and the mapping control unit 9. The mapping control unit 9 determines a location where the supplemental data from the system control unit 10 is mapped into each DS3 frame, and informs the supplemental sending unit 18 of the sending timing with which it will send out the supplemental data to a multiplexer 7. The supplemental data sending unit 18 then sends out the supplemental data to be transmitted from the system control unit 10 to the multiplexer 7 in response to a supplemental data send instruction from the mapping control unit 9. The other operation of the communication device 1 is the same as that of the communication device according to the above-mentioned first embodiment.

As previously mentioned, the communication device 1 according to the fifth embodiment of the present invention can transmit supplemental information on MPEG-2 TS bit strings through free space in the transmission line such as a DS3 network. Accordingly, the communication device does not need either of another network and a specific method required for transmitting the supplemental information, thus reducing the system cost.

In addition, since the communication device 1 according to the fifth embodiment can transmit the supplemental information over the network through which the real data is being transmitted, it can transmit the supplemental information on the real data in synchronization with the real data. The communication device 1 of the fifth embodiment can surely inform the information on the transmission rate for received bit strings or the like of the receiver. Further, the communication device 1 makes it possible for the receiver to smoothly perform an operation mode switching according to the supplemental information, for example.

Numerous variants may be made in the exemplary embodiment shown. It is apparent that other free space in the transmission line rather than the free space within the 80-bit forward part of the information mapping field 20 and the free space behind the stuff present identifier 21, as shown in FIG. 4(b), can be used to transmit the supplemental information. Even in this case, the same advantages are provided. For example, free space in another block as shown in FIG. 4(a) or 4(b), or undefined bits within a DS3 header can be used to transmit the supplemental information.

In a variant, either an error-detecting code 23 or an error-correcting code 24 can be added to the supplemental data. In this case, the receiver can check the validity of the received supplemental data. Furthermore, in the case that the error-correcting code 24 is added to the supplemental data, even if the received supplemental data has an error, the receiver can correct the error. Therefore, in this case the supplemental data can be transmitted more precisely.

Sixth Embodiment

A communication device according to a sixth embodiment is so constructed as to map a sequence of (MPEG-2 TS+RS code) data, which is the summation of an MPEG-2 TS packet, which is transmitted to the communication device at a transmission rate of 19.392658 Mb/s, and a 16-byte Reed Solomon or RS, into DS3 frames. The communication device according to the sixth embodiment has the same structure as that of the above-mentioned first embodiment as shown in FIGS. 1 and 2, and therefore the description of the structure will be omitted hereinafter. Each DS3 frame can have a structure as shown in FIG. 3.

Next, a description will be made as to the operation of the communication device of the sixth embodiment. Basically, the communication device of the sixth embodiment operates in the same way that the communication device of the first embodiment does, and therefore the description will be directed to only the difference between the operation of the communication device of the sixth embodiment and that of the communication device of the first embodiment.

Referring next to FIG. 11(a), there is illustrated a diagram showing the structure of MPEG-2 TS data. FIG. 11(b) is a diagram showing the structure of the summation of MPEG-2 TS data and a 16-byte RS code. FIG. 12 is a table showing the size (in units of bytes) of part of the summation of a 188-byte MPEG-2 TS packet and a 16-byte RS code which is to be mapped into each of a plurality of blocks of each of a plurality of sub-frames included in each DS3 frame, when mapping a sequence of MPEG-2 TS packets, which is transmitted to the communication device at a transmission rate of 19.392658 Mb/s, into DS3 frames, while adding the RS code to each MPEG-2 TS packet.

In the table of FIG. 12, the first through seventh rows running horizontally show the first through seventh sub-frames of each DS3 frame, and the first through eighth columns running vertically show the first through eighth blocks of each sub-frame. "5" in the most upper left-hand box which corresponds to the first block of the first sub-frame indicates that the first 5-byte area of the 10.5-byte (or 84-bit) information mapping field 20 is fixedly assigned to part of (MPEG-2 TS+RS code) data to be mapped into each DS3 frame. For example, in the next block, i.e., the second block of the first sub-frame, the next 5-byte part of the (MPEG-2 TS+RS code) data is fixedly mapped into the information mapping field 20 of the second block, and in the third block of the first sub-frame, the next 5-byte part of the (MPEG-2 TS+RS code) data is fixedly mapped into the information mapping field 20 of the third block. In the eighth block of the seventh sub-frame that is the last block of each DS3 frame, 4-byte or 5-byte part of the (MPEG-2 TS+RS code) data is mapped according to the status of the transmission of DS3 frames. When 4-byte part of the (MPEG-2 TS+RS code) data is mapped into the last block, one-byte null data or stuff is mapped into the remaining area of the last block.

When adding a 16-byte RS code to each MPEG-2 TS packet transmitted thereto at a transmission rate of 19.392658 Mb/s, the transmission rate for (MPEG-2 TS+RS code) data reaches 21.043097 Mb/s. Then the description will be directed to how the communication device 1 multiplexes the (MPEG-2 TS+RS code) bit string whose transmission rate reaches 21.043097 Mb/s into DS3 frames to be transmitted at a transmission rate of 44.736 Mb/s over the DS3 network.

As shown in FIG. 3, when the (MPEG-2 TS+RS code) data is fully mapped into all the payload of each 4,760-bit DS3 frame, the transmission rate at which the (MPEG-2 TS+RS code) data is to be transmitted over the DS3 network channel reaches 44.736 Mb/s×4,704/4,760=44.21 Mb/s.

Similarly, when 2,232 bits (or 279 bytes) of (MPEG-2 TS+RS code) data is mapped into the payload of each 4,760-bit DS3 frame, the transmission rate at which the (MPEG-2 TS+RS code) data is to be transmitted over the DS3 network channel reaches 44.736 Mb/s×2,232/4,760=20.977049 Mb/s. When 2,240 bits (or 280 bytes) of (MPEG-2 TS+RS code) data is mapped into the payload of each 4,760-bit DS3 frame, the transmission rate at which the (MPEG-2 TS+RS code) data is to be transmitted over the DS3 network reaches 44.736 Mb/s×2,240/4,760=21.052235 Mb/s.

Accordingly, when the (MPEG-2 TS+RS code) data is fixedly mapped into a fixed band of the DS3 network channel whose transmission rate is 44.736 Mb/s, the (MPEG-2 TS+RS code) bit string cannot be transmitted at a transmission rate of 21.043097 Mb/s over the 44.736 Mb/s DS3 network. To eliminate the difference between the desired transmission rate and each of the estimated values as mentioned above, the communication device 1 according to the sixth embodiment can map 279 bytes of (MPEG-2 TS+RS code) data into one DS3 frame at one time and then map other 280 bytes of (MPEG-2 TS+RS code) data into another DS3 frame at another time to attain the desired transmission rate of 21.043097 Mb/s.

When mapping 279 bytes of (MPEG-2 TS+RS code) data into one DS3 frame, the communication device 1 maps one-byte null or stuff byte data into a predetermined area included in the DS3 frame, e.g., the information mapping field 20 of the last block within the seventh sub-frame.

As previously mentioned, the communication device 1 according to the sixth embodiment of the present invention can map a sequence of (MPEG-2 TS+RS code) data, which is the summation of an MPEG-2 TS packet which is transmitted thereto at a transmission rate of 19.392658 Mb/s and a 16-byte RS code, directly into DS3 frames. Accordingly, the sixth embodiment can offer the same advantages as provided by the above-mentioned first embodiment.

Seventh Embodiment

A communication device according to a seventh embodiment is so constructed as to map a sequence of MPEG-2 TS data, which is transmitted thereto at a transmission rate of 38.785316 Mb/s, into DS3 frames. The transmission rate of 38.785316 Mb/s is the one for MPEG-2 TS data that is 16-vestigial-sideband (or 16VSB) modulated, intended for digital CATV or the like in U.S.A. The communication device according to the seventh embodiment has the same structure as that of the above-mentioned first embodiment as shown in FIGS. 1 and 2, and therefore the description of the structure will be omitted hereinafter. Each DS3 frame can have a structure as shown in FIG. 3.

Next, a description will be made as to the operation of the communication device of the seventh embodiment. Basically, the communication device of the seventh embodiment operates in the same way that the communication device of the first embodiment does, and therefore the description will be directed to only the difference between the operation of the communication device of the seventh embodiment and that of the communication device of the first embodiment.

FIG. 13 is a table showing the size (in units of bytes) of part of MPEG-2 TS data which is to be mapped into each of a plurality of blocks of each of a plurality of sub-frames included in each DS3 frame, when mapping a sequence of MPEG-2 TS data, which is transmitted to the communication device at a transmission rate of 38.785316 Mb/s, into DS3 frames.

In the table of FIG. 13, the first through seventh rows running horizontally show the first through seventh sub-frames of each DS3 frame, and the first through eighth columns running vertically show the first through eighth blocks of each sub-frame. "9" in the most upper left-hand box which corresponds to the first block of the first sub-frame indicates that the first 9-byte area of the 10.5-byte (or 84-bit) information mapping field 20 is fixedly assigned to part of MPEG-2 TS data to be mapped into each DS3 frame. For example, in the next block, i.e., the second block of the first sub-frame, the next 9-byte part of the MPEG-2 TS data is fixedly mapped into the information mapping field 20 of the second block, and in the third block of the first sub-frame, the next 9-byte part of the MPEG-2 TS data is fixedly mapped into the information mapping field 20 of the third block. In the eighth block of the seventh sub-frame that is the last block of the frame, 9-byte or 10-byte part of the MPEG-2 TS data is mapped according to the status of the transmission of DS3 frames. When 9-byte part of the MPEG-2 TS data is mapped into the last block, one-byte null data or stuff is mapped into the remaining area of the last block.

Then the description will be directed to how the communication device 1 multiplexes the MPEG-2 TS data whose transmission rate reaches 38.785316 Mb/s into DS3 frames to be transmitted at a transmission rate of 44.736 Mb/s over the DS3 network channel.

As shown in FIG. 3, when the MPEG-2 TS data is fully mapped into all the payload of each 4,760-bit DS3 frame, the transmission rate at which the MPEG-2 TS data is to be transmitted over the DS3 network reaches 44.736 Mb/s×4,704/4,760=44.21 Mb/s.

Similarly, when 4,120 bits (or 515 bytes) of MPEG-2 TS data is mapped into the payload of each 4,760-bit DS3 frame, the transmission rate at which the MPEG-2 TS data is to be transmitted over the DS3 network channel reaches 44.736 Mb/s×4,120/4,760=38.721076 Mb/s. When 4,128 bits (or 516 bytes) of MPEG-2 TS data is mapped into the payload of each 4,760-bit DS3 frame, the transmission rate at which the MPEG-2 TS data is to be transmitted over the DS3 network channel reaches 44.736 Mb/s×4,128/4,760= 38.796262 Mb/s.

Accordingly, when the MPEG-2 TS data is fixedly mapped into a fixed band of the DS3 network whose transmission rate is 44.736 Mb/s, the MPEG-2 TS bit string cannot be transmitted at a transmission rate of 38.785316 Mb/s over the 44.736 Mb/s DS3 network. To eliminate the difference between the desired transmission rate and each of the estimated values as mentioned above, the communication device 1 according to the seventh embodiment can map 515 bytes of MPEG-2 TS data into one DS3 frame at one time and then map other 516 bytes of MPEG-2 TS data into another DS3 frame at another time to attain the desired transmission rate of 38.785316 Mb/s.

When mapping 515 bytes of MPEG-2 TS data into one DS3 frame, the communication device 1 maps one-byte null or stuff byte data into a predetermined area included in the DS3 frame, e.g., the information mapping field 20 of the last block within the seventh sub-frame.

As previously mentioned, the communication device 1 according to the seventh embodiment of the present invention can map a sequence of MPEG-2 TS data, which is transmitted thereto at a transmission rate of 38.785316 Mb/s, directly into DS3 frames. Accordingly, the seventh embodiment can offer the same advantages as provided by the above-mentioned first embodiment.

Eighth Embodiment

A communication device according to an eighth embodiment is so constructed as to map a sequence of (MPEG-2 TS+RS code) data, which is the summation of an MPEG-2 TS packet, which is transmitted to the communication device at a transmission rate of 38.785316 Mb/s, and a 16-byte Reed Solomon or RS into DS3 frames. The communication device according to the eighth embodiment has the same structure as that of the above-mentioned first embodiment as shown in FIGS. 1 and 2, and therefore the description of the structure will be omitted hereinafter. Each DS3 frame can have a structure as shown in FIG. 3.

Next, a description will be made as to the operation of the communication device of the eighth embodiment. Basically, the communication device of the eighth embodiment operates in the same way that the communication device of the first embodiment does, and therefore the description will be directed to only the difference between the operation of the communication device of the eighth embodiment and that of the communication device of the first embodiment.

FIG. 14 is a table showing the size (in units of bytes) of part of the summation of a 188-byte MPEG-2 TS packet and a 16-byte RS code which is to be mapped into each of a plurality of blocks of each of a plurality of sub-frames included in each DS3 frame, when mapping a sequence of MPEG-2 TS packets, which is transmitted to the communication device at a transmission rate of 38.785316 Mb/s, into DS3 frames while adding the RS code to each MPEG-2 TS packet.

In the table of FIG. 14, the first through seventh rows running horizontally show the first through seventh sub-frames of each DS3 frame, and the first through eighth columns running vertically show the first through eighth blocks of each sub-frame. "10" in the most upper left-hand box which corresponds to the first block of the first sub-frame indicates that the first 10-byte area of the 10.5-byte (or 84-bit) information mapping field 20 is fixedly assigned to part of (MPEG-2 TS+RS code) data to be mapped into each DS3 frame. For example, in the next block, i.e., the second block of the first sub-frame, the next 10-byte part of the (MPEG-2 TS+RS code) data is fixedly mapped into the information mapping field of the second block, and in the third block of the first sub-frame, the next 10-byte part of the (MPEG-2 TS+RS code) data is fixedly mapped into the information mapping field 20 of the third block. In the eighth block of the seventh sub-frame that is the last block of the frame, 9-byte or 10-byte part of the (MPEG-2 TS+RS code) data is mapped according to the status of the transmission of DS3 frames. When 9-byte part of the (MPEG-2 TS+RS code) data is mapped into the last block, one-byte null data or stuff is mapped into the remaining area of the last block.

When adding a 16-byte RS code to each MPEG-2 TS packet transmitted thereto at a transmission rate of 38.785316 Mb/s, the transmission rate for the (MPEG-2 TS+RS code) data reaches 42.086194 Mb/s. Then the description will be directed to how the communication device 1 multiplexes the (MPEG-2 TS+RS code) data whose transmission rate reaches 42.086194 Mb/s into DS3 frames to be transmitted at a transmission rate of 44.736 Mb/s over the DS3 network channel.

As shown in FIG. 3, when the (MPEG-2 TS+RS code) data is fully mapped into all the payload of each 4,760-bit DS3 frame, the transmission rate at which the (MPEG-2 TS+RS code) data is to be transmitted over the DS3 network reaches 44.736 Mb/s×4,704/4,760=44.21 Mb/s.

Similarly, when 4,472 bits (or 559 bytes) of (MPEG-2 TS+RS code) data is mapped into the payload of each 4,760-bit DS3 frame, the transmission rate at which the (MPEG-2 TS+RS code)-data is to be transmitted over the DS3 network reaches 44.736 Mb/s×4,472/4,760=42.029284 Mb/s. When 4,480 bits (or 560 bytes) of (MPEG-2 TS+RS code) data is mapped into the payload of each 4,760-bit DS3 frame, the transmission rate at which the (MPEG-2 TS+RS code) data is to be transmitted over the DS3 network reaches 44.736 Mb/s×4,480/4,760=42.104471 Mb/s.

Accordingly, when the (MPEG-2 TS+RS code) data is fixedly mapped into a fixed band of the DS3 network, the (MPEG-2 TS+RS code) bit string cannot be transmitted at a transmission rate of 42.086194 Mb/s over the 44.736 Mb/s DS3 network. To eliminate the difference between the desired transmission rate and each of the estimated values as mentioned above, the communication device 1 according to the eighth embodiment can map 559 bytes of (MPEG-2 TS+RS code) data into one DS3 frame at one time and then map other 560 bytes of (MPEG-2 TS+RS code) data into another DS3 frame at another time to attain the desired transmission rate of 42.086194 Mb/s.

When mapping 559 bytes of (MPEG-2 TS+RS code) data into one DS3 frame, the communication device 1 maps one-byte null or stuff byte data into a predetermined area included in the DS3 frame, e.g., the information mapping field 20 of the last block within the seventh sub-frame.

As previously mentioned, the communication device 1 according to the eighth embodiment of the present invention can map a sequence of (MPEG-2 TS+RS code) data, which is the summation of a MPEG-2 TS packet which is transmitted thereto at a transmission rate of 38.785316 Mb/s and a 16-byte RS code, directly into DS3 frames. Accordingly, the eighth embodiment can offer the same advantages as provided by the above-mentioned first embodiment.

Ninth Embodiment

A communication device according to a ninth embodiment is so constructed as to multiplex two channels of MPEG-2 TS data, each of which is transmitted thereto at a transmission rate of 19.392658 Mb/s, onto a DS3 network. The communication device according to the ninth embodiment has the same structure as that of the above-mentioned first embodiment as shown in FIGS. 1 and 2, and therefore the description of the structure will be omitted hereinafter. Each DS3 frame can have a structure as shown in FIG. 3.

Next, a description will be made as to the operation of the communication device of the ninth embodiment. Basically, the communication device of the ninth embodiment operates in the same way that the communication device of the first embodiment does, and therefore the description will be directed to only the difference between the operation of the communication device of the ninth embodiment and that of the communication device of the first embodiment.

Figure 15:
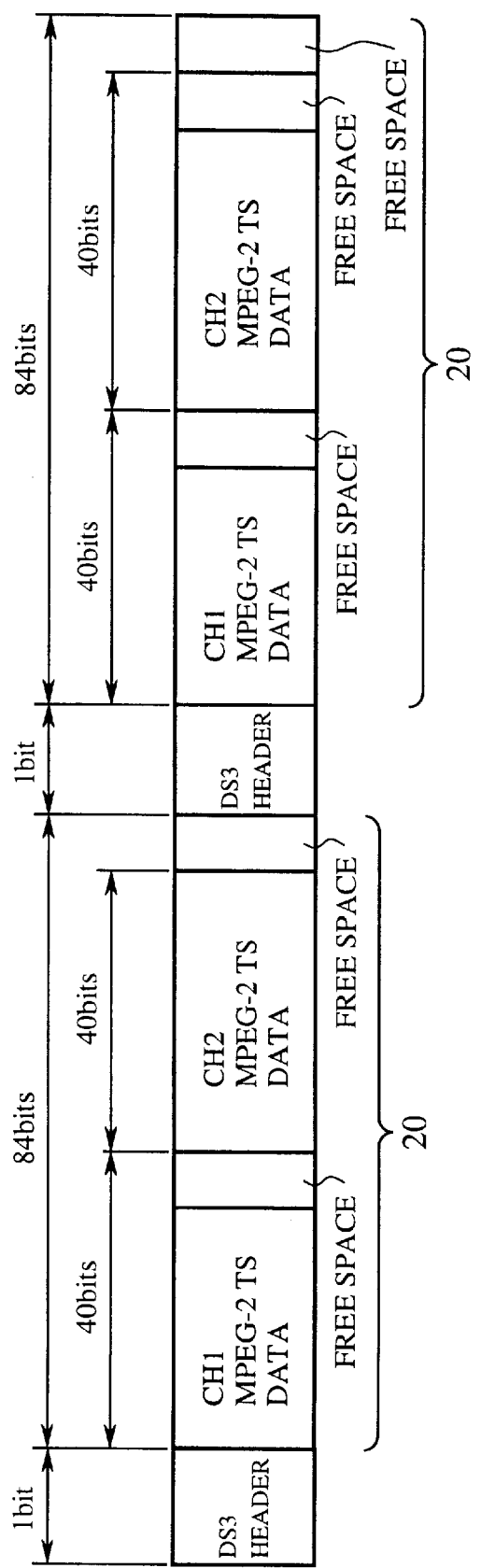
FIG. 15 is a diagram showing the structure of a block into which two channels of MPEG-2 TS data, each of which is transmitted to the communication device at a transmission rate of 19.392658 Mb/s, are mapped into each DS3 frame by a communication device according to a ninth embodiment of the present invention.
Figure 16:
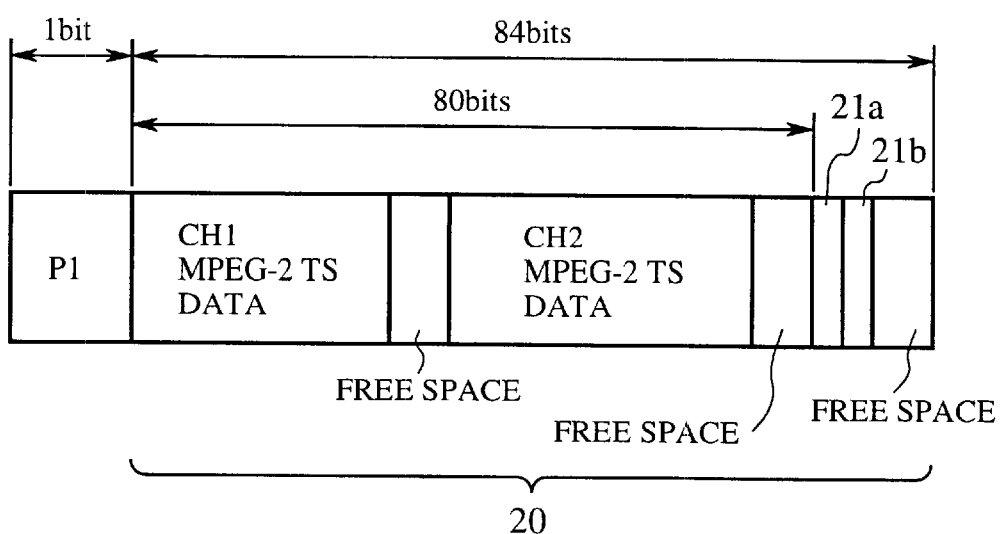
FIG. 16 is a diagram showing the structure of a block into which two stuff present identifiers for the two channels of MPEG-2 TS data are mapped by the communication device according to the ninth embodiment of the present invention.
Figure 17:
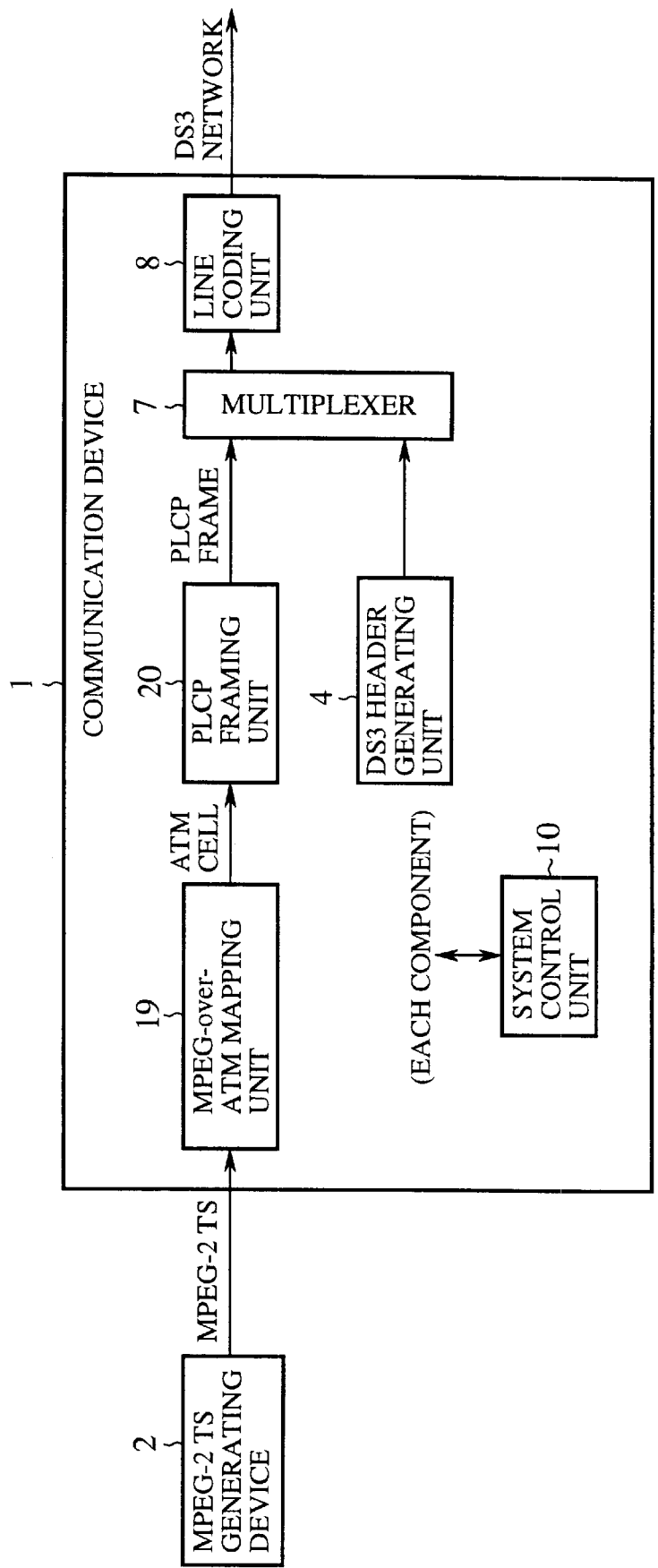
FIG. 17 is a block diagram showing the structure of a prior art communication device.
Figures 18, 19:
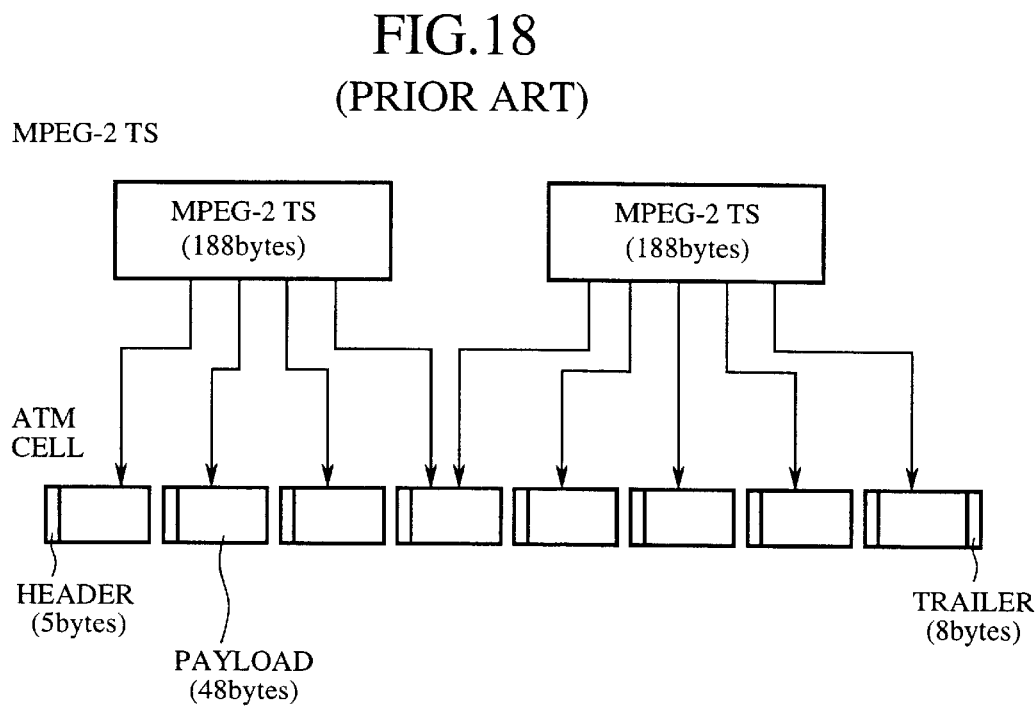
FIG. 18 is a diagram showing a method of mapping MPEG-2 TS streams into ATM cells.
FIG. 19 is a diagram showing the structure of a PLCP frame that is constructed when mapping ATM cells into the DS3 network channel.

Referring next to FIG. 15, there is illustrated a diagram showing locations within each of a plurality of blocks included in each DS3 frame, where two channels of MPEG-2 TS data, each of which is transmitted to the communication device at a transmission rate of 19.392658 Mb/s, are mapped into each DS3 frame. FIG. 16 shows locations where stuff present identifiers 21*a* and 21*b* are mapped in a predetermined block.

As can be seen from FIG. 5, when mapping one channel of MPEG-2 TS data whose transmission rate is 19.392658 Mb/s into DS3 frames, the communication device according to the above-mentioned first embodiment simply maps the MPEG-2 TS data into only 4-byte or 5-byte area within the 10.5-byte information mapping field 20 of each block. In contrast, the communication device 1 according to the ninth embodiment can assign the first 5-byte (or 40-bit) area of the 84-bit information mapping field 20 of each block to the first channel or Channel 1 (ch1) and assign the next 5-byte (or 40-bit) area of the 84-bit information mapping field 20 of each block to the second channel or Channel 1 (ch1), while remaining the last 4-bit area free, as shown in FIG. 15. In addition, the communication device 1 maps both the first stuff present identifier 21*a* for the channel 1 MPEG-2 TS data and the second stuff present identifier 21*b* for the channel 2 MPEG-2 TS data into the last 4-bit empty area of the information mapping field 20, as shown in FIG. 15, within the predetermined block such as the first block of the third sub-frame. In this manner, the communication device 1 according to the ninth embodiment of the present invention maps two channels of MPEG-2 TS data, each of which is transmitted to the communication device at a transmission rate of 19.392658 Mb/s, into DS3 frames.

As previously mentioned, the communication device 1 according to the ninth embodiment of the present invention can map two channels of MPEG-2 TS data, each of which is transmitted to the communication device at a transmission rate of 19.392658 Mb/s, into DS3 frames. Accordingly, the ninth embodiment can offer the same advantages as provided by the above-mentioned first embodiment, for each of the two channels of MPEG-2 TS data, each of which is transmitted to the communication device at a transmission rate of 19.392658 Mb/s.

Tenth Embodiment

A communication device is so constructed as to define an area into which data can be mapped on each frame, such as a DS3 frame, into which a bit string to be transmitted such as MPEG-2 TS data is mapped, in units of one byte and to also define a stuff field 22 as shown in FIG. 4(*c*) as a one-byte area so that the bit string, such as MPEG-2 TS data, is separately mapped into the area defined on each frame in units of one byte in the same way that the bit string received has been separated in units of one byte. The communication device according to the tenth embodiment has the same structure as that of the above-mentioned first embodiment as shown in FIGS. 1 and 2, and therefore the description of the structure will be omitted hereinafter. Each DS3 frame can have a structure as shown in FIG. 3.

In the communication device 1 according to the tenth embodiment of the present invention, all the components, as shown in FIGS. 1 and 2, placed at the front of a line coding unit 8, which are closer to a MPEG-2 TS generating device 2 than the line coding unit, perform their operations in units of one byte. The communication device defines a data transmission area into which data can be mapped on each frame, such as a DS3 frame, into which a bit string to be transmitted such as MPEG-2 TS data is mapped, in units of one byte and also defines the stuff field 22 as shown in FIG. 4(*c*) as a one-byte area so that the bit string, such as MPEG-2 TS data, is separately mapped into the data transmission area defined on each frame, such as an information mapping field 20 as shown in FIGS. 4(*a*) to 4(*c*), in units of one byte in the same way that the bit string received can be separated in units of one byte. In other words, the mapping control unit 9 of the communication device 1 performs a control operation so that one-byte MPEG-2 TS data is mapped into the first one-byte area of the information mapping field 20, from its most significant bit to its least significant bit, first.

Accordingly, the tenth embodiment offers the following advantage in addition to the advantages provided by the first embodiment.

Although the receiver requires a circuit for performing a synchronization process to recognize the head of each MPEG-2 TS packet by searching through the received bit string for TS headers as shown in FIG. 11(*a*), the size of circuit that implements the synchronization process can be reduced because the communication device 1 according to the tenth embodiment can transmit the MPEG-2 TS data while making the data mapped into the received frames in phase with each other at a byte level.

Many widely different embodiments of the present invention may be constructed without departing from the spirit and scope of the present invention. It should be understood that the present invention is not limited to the specific embodiments described in the specification, except as defined in the appended claims.

What is claimed is:

1. A communication method for transmitting a sequence of data, which is transmitted thereto at a given transmission rate, at a desired transmission rate greater than the former transmission rate, said method comprising the steps of:

in order to map the sequence of data into a plurality of frames in a predetermined form, each of which consists of a plurality of blocks, assigning a predetermined amount of data to a data transmission area in each of said plurality of blocks included in each frame so that the sequence of data is nearly-uniformly arranged over said plurality of blocks included in each frame;

providing a stuff area for a predetermined one of said plurality of blocks included in each frame and determining whether or not to map part of said sequence of data into said stuff area, so as to transmit said plurality of frames at the desired transmission rate;

mapping either part of said sequence of data or null data into said stuff area according to a determination done in said determining step; and providing a stuff present identifier indicating whether or not part of said sequence of data is mapped into said stuff area for each frame.

2. The communication method according to claim 1, wherein said stuff present identifier providing step is the step of providing an odd number of stuff present identifiers each indicating whether or not part of said sequence of data is mapped into said stuff area for each frame so that they are distributed in each frame.

3. The communication method according to claim 1, further comprising the step of adding an error-detecting code to said stuff present identifier.

4. The communication method according to claim 2, further comprising the step of adding an error-detecting code to each of said plurality of stuff present identifiers.

5. The communication method according to claim 1, further comprising the step of adding an error-correcting code to said stuff present identifier.

6. The communication method according to claim 2, further comprising the step of adding an error-correcting code to each of said plurality of stuff present identifiers.

7. The communication method according to claim 1, further comprising the step of mapping supplemental information on said sequence of data into free space of the data transmission area of at least one of said plurality of blocks included in each frame.

8. The communication method according to claim 7, wherein information on the transmission rate at which said sequence of data to be mapped into said plurality of frames in the predetermined form is transmitted is mapped, as said supplemental information, into said free space.

9. The communication method according to claim 7, wherein information on the status or characteristics of communication upon transmission of said plurality of frames is mapped, as said supplemental information, into said free space.

10. The communication method according to claim 1, wherein both the data transmission area of each of said plurality of blocks into which said sequence of data is mapped and said stuff area included in each frame are defined in units of one byte so that said sequence of data is separately mapped into the data transmission area of each of said plurality of blocks included in each frame in units of one byte in the same way that said sequence of data to be mapped into said plurality of frames can be separated in units of one byte.

11. A communication device for transmitting a sequence of data, which is transmitted thereto at a given transmission rate, at a desired transmission rate greater than the former transmission rate over a transmission line, said device comprising:

mapping means, in order to map the sequence of data into a plurality of frames in a predetermined form, each of which consists of a plurality of blocks, for assigning a predetermined amount of data to a data transmission area in each of said plurality of blocks included in each frame so that the sequence of data is nearly-uniformly arranged over said plurality of blocks included in each frame; and control means for controlling said mapping means in such a manner that said mapping means provides a stuff area for a predetermined one of said plurality of blocks included in each frame and determines whether or not to map part of said sequence of data into said stuff area, so as to transmit said plurality of frames at the desired transmission rate, then maps either part of said sequence of data or null data into said stuff area according to a determination result, and provides a stuff present identifier indicating whether or not part of said sequence of data is mapped into said stuff area for each frame.

12. The communication device according to claim 11, wherein said control means controls said mapping means in such a manner that said mapping means provides an odd number of stuff present identifiers each indicating whether or not part of said sequence of data is mapped into said stuff area for each frame so that they are distributed in each frame.

13. The communication device according to claim 11, wherein said control means controls said mapping means in such a manner that said mapping means adds an error-detecting code to said stuff present identifier.

14. The communication device according to claim 11, wherein said control means controls said mapping means in such a manner that said mapping means adds an error-correcting code to said stuff present identifier.

15. The communication device according to claim 1, wherein said mapping means includes supplemental data mapping means for mapping supplemental information on said sequence of data into free space of the data transmission area of at least one of said plurality of blocks included in each frame.

16. The communication device according to claim 15, wherein said supplemental data mapping means maps information on the transmission rate at which said sequence of data to be mapped into said plurality of frames in the predetermined form is transmitted, as said supplemental information, into said free space.

17. The communication device according to claim 15, wherein said supplemental data mapping means maps information on the status or characteristics of communication upon transmission of said plurality of frames, as said supplemental information, into said free space.

18. The communication device according to claim 11, wherein said mapping means define both the data transmission area of each of said plurality of blocks into which said sequence of data is mapped and said stuff area in units of one byte so that said sequence of data is separately mapped into the data transmission area of each of said plurality of blocks included in each frame in units of one byte in the same way that said sequence of data to be mapped into said plurality of frames can be separated in units of one byte.

19. The communication device according to claim 11, wherein said sequence of data is MPEG-2 (Moving Picture Experts Group2) TS (Transport Stream) streams, which are defined by International Standard ISO/IEC (International Organization for Standardization/International Electrotechnical Commission) 13,818-1.

20. The communication device according to claim 11, wherein said transmission line is a DS3 (Digital Signal, Level 3) network, which is defined by ANSI (American National Standards Institute).

* * * * *